United States Patent
Fujinaga et al.

(10) Patent No.: US 8,932,757 B2
(45) Date of Patent: Jan. 13, 2015

(54) ANODE FOR LITHIUM ION SECONDARY BATTERY, LITHIUM ION SECONDARY BATTERY, ELECTRIC TOOL, BATTERY CAR, AND ELECTRIC POWER STORAGE SYSTEM

(75) Inventors: Takashi Fujinaga, Fukushima (JP); Shunsuke Kurasawa, Fukushima (JP); Momoe Adachi, Tokyo (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 448 days.

(21) Appl. No.: 13/017,216

(22) Filed: Jan. 31, 2011

(65) Prior Publication Data

US 2011/0192623 A1 Aug. 11, 2011

(30) Foreign Application Priority Data

Feb. 5, 2010 (JP) ................. P2010-024584

(51) Int. Cl.
| | | |
|---|---|---|
| H01M 4/134 | (2010.01) | |
| H01M 4/36 | (2006.01) | |
| H01M 4/38 | (2006.01) | |
| H01M 10/052 | (2010.01) | |
| H01M 4/1395 | (2010.01) | |
| H01M 4/04 | (2006.01) | |

(52) U.S. Cl.
CPC .............. *H01M 4/134* (2013.01); *H01M 4/366* (2013.01); *H01M 4/386* (2013.01); *H01M 10/052* (2013.01); *H01M 4/1395* (2013.01); *H01M 4/0421* (2013.01); *Y02E 60/122* (2013.01); *Y02T 10/7011* (2013.01)

USPC ........................................ 429/218.1

(58) Field of Classification Search
None
See application file for complete search history.

(56) References Cited

U.S. PATENT DOCUMENTS

| | | | |
|---|---|---|---|
| 6,878,490 B2 * | 4/2005 | Gao et al. ................... | 429/231.1 |
| 2009/0256134 A1 * | 10/2009 | Buchine et al. ................. | 257/9 |
| 2010/0119948 A1 * | 5/2010 | Hasegawa et al. ......... | 429/231.95 |

FOREIGN PATENT DOCUMENTS

| | | |
|---|---|---|
| JP | 2000-036323 | 2/2000 |
| JP | 2001-273892 | 10/2001 |
| JP | 2002-289177 | 10/2002 |
| JP | 2004-349162 | 12/2004 |
| JP | 2007-317419 | 12/2007 |
| WO | WO 2008139682 A1 * | 11/2008 |

OTHER PUBLICATIONS

Definition of laminar and lamina from www.merriam-webster.com, accessed Aug. 7, 2013.*
IDPL Machine Translation of JP 2004-349162 A.*

* cited by examiner

*Primary Examiner* — Maria J Laios
*Assistant Examiner* — Scott S Carrico
(74) *Attorney, Agent, or Firm* — K&L Gates LLP

(57) ABSTRACT

A lithium ion secondary battery having superior cycle characteristic is provided. The lithium ion secondary battery includes a cathode, an anode and an electrolyte. The anode has an anode active material layer including a plurality of anode active material fibers containing silicon as an element provided on an anode current collector.

14 Claims, 12 Drawing Sheets

ANODE FOR LITHIUM ION SECONDARY BATTERY, LITHIUM ION SECONDARY BATTERY, ELECTRIC TOOL, BATTERY CAR, AND ELECTRIC POWER STORAGE SYSTEM

CROSS REFERENCES TO RELATED APPLICATIONS

The present application claims priority to Japanese Priority Patent Application JP 2010-024584 filed in the Japan Patent Office on Feb. 5, 2010, the entire content of which is hereby incorporated by reference.

BACKGROUND

The present application relates to an anode for a lithium ion secondary battery that contains an anode active material containing silicon (Si) as an element, a lithium ion secondary battery including the same, an electric tool using the lithium ion secondary battery, a battery car using the lithium ion secondary battery, and an electric power storage system using the lithium ion secondary battery.

In recent years, portable electronic devices such as camera-integrated VTR (videotape recorders), mobile phones, and notebook personal computers have been widely used, and it is strongly demanded to reduce their size and weight and to achieve their long life. Accordingly, as a power source for the portable electronic devices, a battery, in particular a lightweight secondary battery capable of providing a high energy density has been developed. In recent years, it has been considered to apply such a secondary battery not only to the small electronic devices but also to a large electronic device represented by a battery car or the like.

Specially, a secondary battery using insertion and extraction of lithium for charge and discharge reaction (so-called lithium ion secondary battery) is extremely prospective, since such a secondary battery is able to provide a higher energy density compared to a lead battery and a nickel cadmium battery.

The lithium ion secondary battery includes an anode having a structure in which an anode active material layer containing an anode active material is provided on an anode current collector. As the anode active material, a carbon material has been widely used. However, in recent years, as the high performance and the multi functions of the portable electronic devices are developed, further improvement of the battery capacity is demanded. Thus, it has been considered to use silicon instead of the carbon material. Since the theoretical capacity of silicon (4199 mAh/g) is significantly higher than the theoretical capacity of graphite (372 mAh/g), it is expected that the battery capacity is thereby highly improved.

However, in the case where the anode active material layer is formed by depositing silicon as an anode active material by vapor-phase deposition method, the binding characteristics are not sufficient. Thus, if charge and discharge are repeated, there is a possibility that the anode active material layer is intensely expanded and shrunk to be pulverized. If the anode active material layer is pulverized, depending on the pulverization degree, an irreversible lithium oxide is excessively formed resulting from increase of the surface area, and current collectivity is lowered resulting from dropping from the anode current collector. Accordingly, the cycle characteristics as important characteristics of the secondary battery are lowered.

Therefore, to improve the cycle characteristics even when silicon is used as the anode active material, various devices have been invented. Specifically, the technique to form the anode active material layer as a multilayer structure by depositing silicon several times in vapor-phase deposition method has been disclosed (for example, see Japanese Unexamined Patent Application Publication No. 2007-317419). In addition, the technique to cover the surface of the anode active material with a metal such as iron, cobalt, nickel, zinc, and copper (for example, see Japanese Unexamined Patent Application Publication No. 2000-036323), the technique to diffuse a metal element such as copper not being alloyed with lithium in an anode active material (for example, see Japanese Unexamined Patent Application Publication No. 2001-273892), the technique to form a solid solution of copper in an anode active material (for example, see Japanese Unexamined Patent Application Publication No. 2002-289177) and the like have been proposed. In addition, the applicant of the application has disclosed the technique that a multilayer structure in which the first layer and the second layer both containing silicon and each having different oxygen content are alternately layered is provided, and thereby intense expansion and shrinkage of the anode active material layer are inhibited and structural breakage is inhibited (for example, see Japanese Unexamined Patent Application Publication No. 2004-349162).

SUMMARY

The recent portable electronic devices increasingly tend to become small, and the high performance and the multifunctions thereof tend to be increasingly developed. Accordingly, there is a tendency that charge and discharge of the secondary battery are frequently repeated, and thus the cycle characteristics are easily lowered. In particular, in the lithium ion secondary battery in which silicon is used as an anode active material to attain a high capacity, the cycle characteristics are easily lowered significantly, being influenced by pulverization of the anode active material layer at the time of the foregoing charge and discharge. Thus, further improvement of the cycle characteristics of the secondary battery is aspired.

It is desirable to provide an anode for a lithium ion secondary battery capable of improving the cycle characteristics, a lithium ion secondary battery using the same, an electric tool using the foregoing lithium ion secondary battery, a battery car using the foregoing lithium ion secondary battery, and an electric power storage system using the foregoing lithium ion secondary battery.

According to an embodiment, there is provided an anode for a lithium ion secondary battery having an anode active material layer including a plurality of anode active material fibers containing silicon as an element provided on an anode current collector. Further, according to an embodiment, there is provided a lithium ion secondary battery including a cathode, the anode for a lithium ion secondary battery of the embodiment, and an electrolyte. Further, according to an embodiment of the application, there is provided an electric tool, a battery car, and an electric power storage system that use the foregoing lithium ion secondary battery as a power source or an electric power storage source.

In the anode for a lithium ion secondary battery, the lithium ion secondary battery, the electric tool, the battery car, and the electric power storage system of the embodiments of the application, the anode active material layer is structured including a plurality of anode active material fibers containing silicon as an element. Thereby, localized concentration of stress associated with expansion and shrinkage at the time of charge and discharge in the anode active material layer is relaxed.

According to the anode for a lithium ion secondary battery of the embodiment, the anode active material layer is made using a plurality of anode active material fibers containing silicon as an element. Thereby, structural break, such as cracking of the anode active material layer, is inhibited, and contact characteristics between the anode active material layer and the anode current collector, and current collectivity are improved, resulting from relaxing of localized concentration of stress associated with expansion and shrinkage at the time of charge and discharge in the anode active material layer. Therefore, in the case where the anode for a lithium ion secondary battery is applied to a lithium ion secondary battery, while a high capacity is realized by using silicon as an anode active material, superior cycle characteristics are also able to be obtained. Further, according to the electric tool, the battery car, and the electric power storage system of the embodiments, since the lithium ion secondary battery with superior cycle characteristics is used, usage for longer time period is enabled.

Additional features and advantages are described herein, and will be apparent from the following Detailed Description and the figures.

DETAILED DESCRIPTION

The present application will be hereinafter described in detail with reference to the drawings. The description will be given in the following order.

Figure 1:
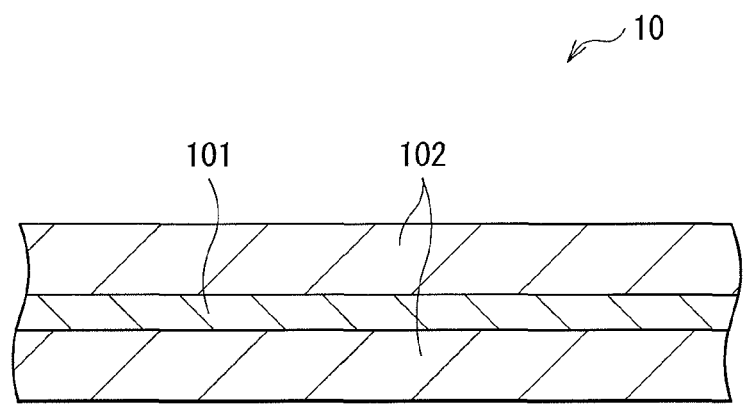
FIG. 1 is a schematic cross sectional view illustrating an anode for a lithium ion secondary battery as a first embodiment.

1. First embodiment (anode: example that an anode active material layer is not particulate)
2. Second embodiment (anode: example that an anode active material layer is particulate)
3. Third embodiment (example of a first secondary battery to a third secondary battery including the foregoing anodes)
  3-1. First secondary battery (cylindrical type)
  3-2. Second secondary battery (laminated film type)
  3-3. Third secondary battery (square type)
4. Application of a lithium ion secondary battery First Embodiment
Structure of an Anode FIG. 1 illustrates a schematic cross sectional structure of an anode for a lithium ion secondary battery as a first embodiment (hereinafter simply referred to as "anode") 10. The anode has, for example, a structure in which an anode active material layer 102 is provided on a surface of an anode current collector 101. The anode active material layer 102 may be provided on both faces of the anode current collector 101 as illustrated in FIG. 1, or may be provided only on a single face of the anode current collector 101.

The anode current collector 101 is preferably made of a metal material having favorable electrochemical stability, favorable electric conductivity, and favorable mechanical strength. Examples of the metal materials include copper (Cu), nickel (Ni), and stainless steel. Specially, copper is preferable as the metal material, since a high electric conductivity is able to be thereby obtained.

In particular, the metal material composing the anode current collector 101 preferably contains one or more metal elements not forming an intermetallic oxide with an electrode reactant. If the intermetallic oxide is formed with the electrode reactant, lowering of the current collectivity characteristics and separation of the anode active material layer 102 from the anode current collector 101 easily occur, since the anode current collector 101 is broken by being affected by a stress due to expansion and shrinkage of the anode active material layer 102 at the time of charge and discharge. Examples of the metal elements include copper, nickel, titanium (Ti), iron (Fe), and chromium (Cr).

Further, the foregoing metal material preferably contains one or more metal elements being alloyed with the anode active material layer 102. Thereby, the contact characteristics between the anode current collector 101 and the anode active material layer 102 are improved, and thus the anode active material layer 102 is hardly separated from the anode current collector 101. For example, in the case that the anode active material of the anode active material layer 102 contains silicon (Si), examples of metal elements that do not form an intermetallic oxide with the electrode reactant and are alloyed with the anode active material layer 102 include copper, nickel, and iron. These metal elements are preferable in terms of the strength and the electric conductivity as well.

The anode current collector 101 may have a single layer structure or a multilayer structure. In the case where the anode current collector 101 has the multilayer structure, for example, it is preferable that the layer adjacent to the anode active material layer 102 is made of a metal material being alloyed with the anode active material layer 102, and layers not adjacent to the anode active material layer 102 are made of other metal material.

The surface of the anode current collector 101 is preferably roughened. Thereby, due to the so-called anchor effect, the contact characteristics between the anode current collector 101 and the anode active material layer 102 are improved. In this case, it is enough that at least the surface of the anode current collector 101 opposed to the anode active material layer 102 is roughened. Examples of roughening methods include a method of forming fine particles by electrolytic treatment. The electrolytic treatment is a method of providing concavity and convexity by forming fine particles on the surface of the anode current collector 101 by electrolytic method in an electrolytic bath. A copper foil provided with the electrolytic treatment is generally called "electrolytic copper foil."

Ten point height of roughness profile Rz of the surface of the anode current collector 101 is, for example, preferably from 1.5 μm to 6.5 μm both inclusive, since thereby the contact characteristics between the anode current collector 101 and the anode active material layer 102 are further improved.

Figure 2:
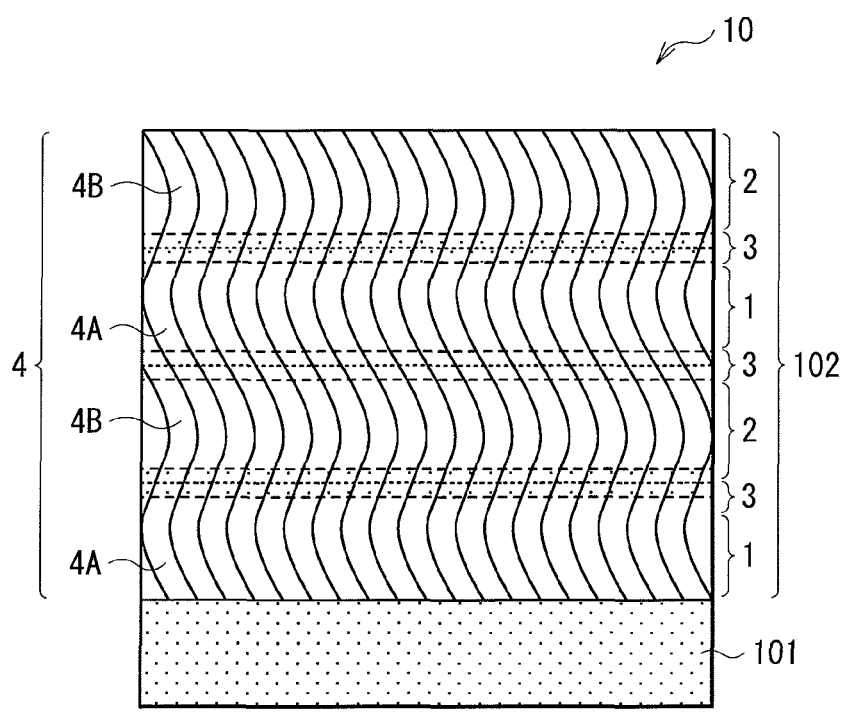
FIG. 2 is a cross sectional view illustrating a detailed structure of the anode active material layer illustrated in FIG. 1.

FIG. 2 illustrates a detailed cross sectional structure of the anode active material layer 102. As illustrated in FIG. 2, the anode active material layer 102 includes a plurality of anode active material fibers 4 aligned in the in-plane direction along the surface of the anode current collector 101, each of which extends in the thickness direction of the anode active material layer 102, while snaking to repeatedly form an S-shape, for example. The anode active material fibers 4 also include a laminar high-concentration oxygen-containing region 3 (hereinafter simply referred to as "oxygen-containing region 3") having higher oxygen content than other regions in the thickness direction of the anode active material layer 102. Specifically, the anode active material fibers 4 are formed into the S-shape by, for example, a pair of curvature sections 4A and 4B curving in different directions (FIG. 2 illustrates an example in which the curvature is in opposite directions) being linked in the oxygen-containing region 3. That is, the anode active material layer 102 has a multilayer structure in which a laminar first region 1 including the curvature section 4A, the oxygen-containing region 3, a laminar second region 2 including the curvature section 4B, and the oxygen-containing region 3 are repeatedly layered in sequence. The numbers of layers of the first region 1 and the second region 2 in the multilayer structure are not limited to those illustrated in FIG. 2, and are able to be selected accordingly. Although an example is illustrated in FIG. 2 in which the anode active material fibers 4 form a rope-shaped texture that is continuous from a position in contact with the anode current collector 101 to the uppermost face of the anode active material layer 102, the embodiment is not limited thereto. The anode active material fibers 4 may be broken midway in the thickness direction of the anode active material layer 102.

The anode active material fiber 4 is a thread-like texture composed of an anode active material observed by an electron microscope such as TEM, in which the aspect ratio (ratio between a diameter and a length) is 1:10 or more, and the maximum value of the diameter is 50 nm or less. In the case where the anode active material fibers 4 are formed by a vapor-phase deposition method such as electron beam evaporation method, each of the plurality of anode active material fibers 4 is obtained by growing independently with different locations as the base point.

The thickness of the first region 1 is, for example, 50 nm to 3000 nm both inclusive, the thickness of the oxygen-containing region 3 is, for example, 10 nm to 200 nm both inclusive, and the thickness of the second region 2 is, for example, 50 nm to 3000 nm both inclusive.

The anode active material contains, as an element, silicon (Si) that is an anode material capable of inserting and extracting electrode reactants. Silicon has a high ability to insert and extract lithium, and thereby a high energy density is able to be obtained. The anode material may be silicon in the form of simple substance, an alloy, or a compound. Otherwise, the anode material may have one or more phases of simple substance, an alloy, or a compound of silicon at least in part. Such a material may be used singly, or a plurality thereof may be used by mixture. In the invention, "the alloy" includes an alloy containing one or more metal elements and one or more metalloid elements, in addition to an alloy composed of two or more metal elements. It is needless to say that the alloy in this embodiment may contain a nonmetallic element. The texture thereof includes a solid solution, a eutectic crystal (eutectic mixture), an intermetallic compound, and a texture in which two or more thereof coexist.

Examples of alloys of silicon include an alloy containing at least one selected from the group consisting of tin (Sn), nickel, copper, iron, cobalt (Co), manganese (Mn), zinc (Zn), indium (In), silver (Ag), titanium, germanium (Ge), bismuth (Bi), antimony (Sb), arsenic (As), magnesium (Mg), calcium (Ca), aluminum (Al), and chromium as a second element other than silicon. In particular, by adding an appropriate amount of iron, cobalt, nickel, germanium, tin, arsenic, zinc, copper, titanium, chromium, magnesium, calcium, aluminum, or silver as second element to the anode active material, energy density is possibly further improved than in the anode active material composed of silicon simple substance. In the case that these second elements having the possibility of improving energy density are contained in the anode active material by, for example, a percentage of 1.0 atomic % (at %) to 40 at % both inclusive, contribution to improvement of discharge capacity retention ratio as a secondary battery clearly appears.

Examples of compounds of silicon include a compound having oxygen (O) or carbon (C) as an element other than silicon. The compound of silicon may contain, for example, one or a plurality of the foregoing second elements as an element other than silicon.

In the oxygen-containing region 3, at least some of the oxygen are preferably bonded to some of the silicon. In this case, the bonding state may be silicon monoxide or silicon dioxide. Otherwise, it may be in other metastable states.

The anode active material preferably further contains at least one element selected from the group consisting of iron, cobalt, nickel, titanium, chromium, and molybdenum (Mo), since thereby expansion and shrinkage of the anode active material layer 102 is inhibited.

The anode active material layer 102 is formed by, for example, using coating method, vapor-phase deposition method, liquid-phase deposition method, spraying method, firing method, or a combination of two or more of these methods. In particular, the anode active material layer 102 is preferably formed using vapor-phase deposition method, and the anode active material layer 102 and the anode current collector 101 are preferably alloyed in at least part of the interface thereof. Specifically, at the interface thereof, the element of the anode current collector 101 may be diffused in the anode active material layer 102; or the element of the anode active material layer 102 may be diffused in the anode current collector 101; or these elements may be diffused in each other. Thereby, breakage of the anode active material layer 102 due to expansion and shrinkage at the time of charge and discharge hardly occurs, and the electron conductivity between the anode current collector 101 and the anode active material layer 102 is improved.

In the case where the anode active material layer 102 contains a metal element such as iron, cobalt, titanium, chromium, and molybdenum as an element of the anode active material in addition to silicon, the anode active material layer 102 is able to be formed using an evaporation source in which the metal element is mixed or by using multiple evaporation sources in depositing the anode active material by using evaporation method as vapor-phase deposition method, for example.

In addition, the oxygen-containing region 3 is able to be formed by oxygen gas or nitrogen gas being introduced into a chamber intermittently in the case where the anode active material is deposited by using vapor-phase deposition method. In particular, in the case where desired oxygen content or nitrogen content is not obtained by simply introducing oxygen gas or nitrogen gas, a liquid (such as vapor) may be introduced into the chamber. Interfaces between the oxygen-containing region 3 and the other regions (first region 1 and second region 2) may be clear or unclear. That is, the change in oxygen content in the vicinity of the interfaces between the oxygen-containing region 3, and the first region 1 and second region 2 may be continuous or discontinuous.

Examples of vapor-phase deposition method include physical deposition method and chemical deposition method. More specific examples include vacuum evaporation method, sputtering method, ion plating method, laser ablation method, thermal CVD (Chemical Vapor Deposition) method, plasma CVD method, and spraying method. As liquid-phase deposition method, a known technique such as electric plating and electroless plating is able to be used. Firing method is, for example, a method in which a particulate anode active material mixed with a binder or the like is dispersed in a solvent and the anode current collector is coated with the resultant, and heat treatment is subsequently provided at temperature higher than the melting point of the binder or the like. Examples of firing method include a known technique such as atmosphere firing method, reactive firing method, and hot press firing method.

As in the foregoing, the anode active material layer 102 has a multilayer structure in which a unit having the first region 1, the oxygen-containing region 3, and the second region 2 in sequence is repeatedly layered, and thereby internal stress of the anode active layer 102 resulting from expansion and shrinkage of the anode active material at the time of charge and discharge is more easily relaxed. Further, in the case where the deposition step of the anode active material layer 102 is divided into a plurality of times (the anode active material layer 102 is successively formed and layered) in forming the anode active material layer 102 by using evaporation method or the like associated with high heat at the time of forming a film, the following advantage is obtained. That is, compared to a case that the anode active material layer 102 having a single layer structure is formed in one time deposition treatment, time that the anode current collector 101 is exposed at high heat is able to be shortened, and thermal damage to the anode current collector 101 is able to be decreased.

Manufacturing Method of the Anode

The anode 10 is manufactured, for example, by the following procedure. Specifically, first, the anode current collector 101 is prepared, and the surface of the anode current collector 101 is provided with roughening treatment according to needs. After that, the first region 1, the oxygen-containing region 3, and the second region 2 containing the foregoing anode active material are sequentially deposited a plurality of times on the surface of the anode current collector 101 by using the foregoing methods, such as vapor-phase deposition method, to form the anode active material layer 102 having a multilayer structure. If vapor-phase deposition method is used, the anode active material may be deposited while the anode current collector 101 is fixed, or the anode active material may be deposited while the anode current collector 101 is rotated.

In this case, in particular, an example in which the anode active material 102 is formed by vacuum evaporation method using an electron beam evaporation apparatus (hereinafter simply referred to as an "evaporation apparatus") illustrated in FIG. 3 will be described in detail.

Figure 3:
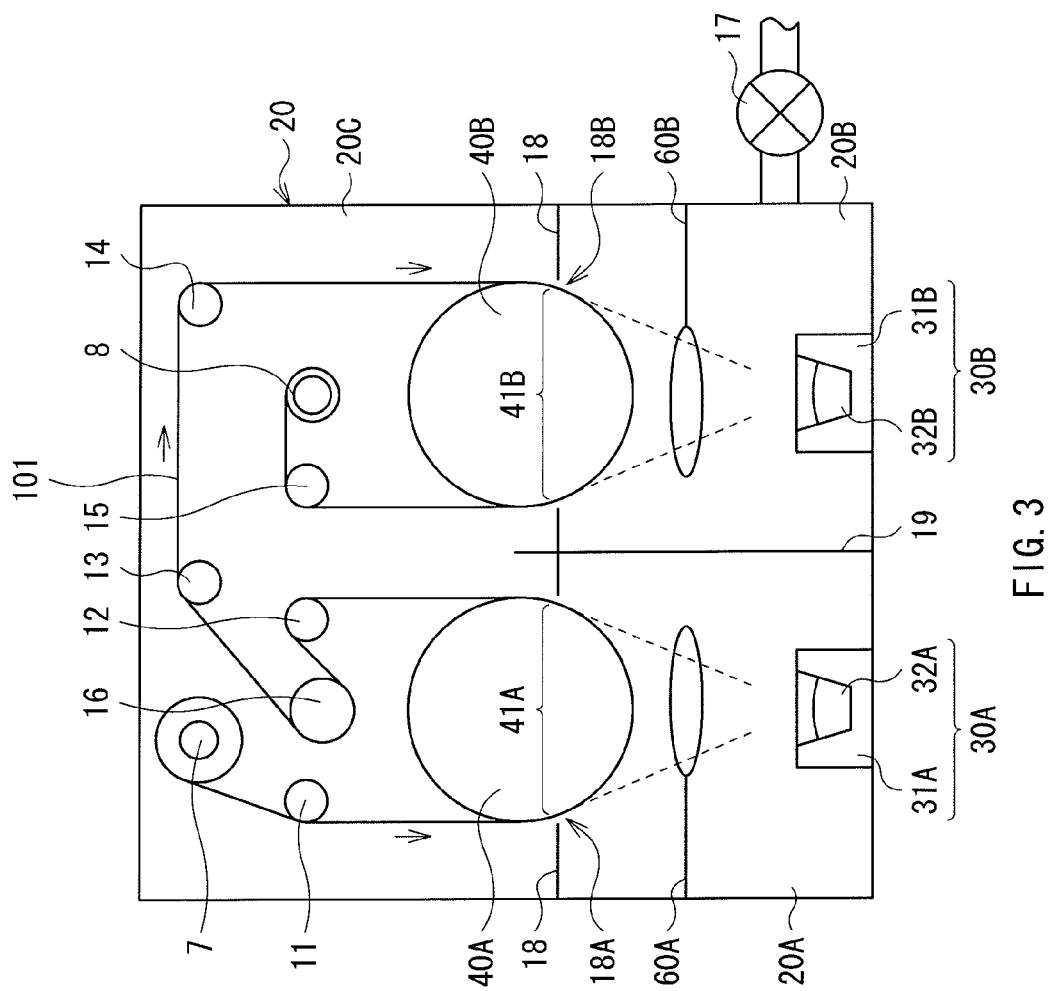
FIG. 3 is a schematic view illustrating a configuration of evaporation apparatus used to manufacture the anode for a lithium ion secondary battery illustrated in FIG. 1.

FIG. 3 is a schematic view illustrating a configuration of an evaporation apparatus favorable for manufacturing the anode of this embodiment. The evaporation apparatus evaporates evaporation materials 32A and 32B contained in crucibles 31A and 31B, deposits the resultant on the surface of the anode current collector 101 as an evaporation object composed of a strip-shaped metal foil or the like held by can rolls 40A and 40B, and thereby forming the anode active material layer 102.

The evaporation apparatus includes evaporation sources 30A and 30B, the can rolls (film-forming rolls) 40A and 40B, shutters 60A and 60B, take-up rollers 7 and 8, guide rollers 11 to 15, and a feed roller 16 within an evaporation treatment bath 20. A vacuum ventilator 17 is provided on the outer side of the evaporation treatment bath 20.

The evaporation treatment bath 20 is partitioned by a partition plate 18 into two spaces, evaporation source setting chambers 20A and 20B; and an evaporation object moving chamber 20C. The evaporation source setting chamber 20A and the evaporation source setting chamber 20B are separated by a dividing wall 19. The shutter 60A is provided in addition to the evaporation source 30A in the evaporation source setting chamber 20A, and the shutter 60B is provided in addition to the evaporation source 30B in the evaporation source setting chamber 20B. The evaporation sources 30A and 30B, and the shutters 60A and 60B will be described in detail hereafter. The evaporation treatment bath 20 is provided with a gas inlet (not shown) and oxygen gas is able to be supplied.

The can rolls 40A and 40B are respectively set above the evaporation sources 30A and 30B in the evaporation object moving chamber 20C. However, the partition plate 18 is provided with openings 18A and 18B in two locations corresponding to the can rolls 40A and 40B, and parts of the can rolls 40A and 40B project into the evaporation source setting chambers 20A and 20B. Further, as a means for holding the anode current collector 101 and moving it in the length direction thereof, the take-up rollers 7 and 8, the guide rollers 11 to 15, and the feed roller 16 are each arranged in predetermined positions in the evaporation object moving chamber 20C.

In this case, the anode current collector 101 is in a state in which, for example, one end side is taken up by the take-up roller 7, and the other end side is attached to the take-up roller 8 by way of the guide roller 11, the can roll 40A, the guide roller 12, the feed roller 16, the guide roller 13, the guide roller 14, the can roll 40B, and the guide roller 15, in sequence from the take-up roller 7. The anode current collector 101 is arranged in contact with the respective outer periphery faces of the take-up rollers 7 and 8, the guide rollers 11 to 15, and the feed roller 16. One face (front surface) of the anode collector 101 contacts the can roll 40A and the other face (back surface) contacts the can roll 40B. The take-up rollers 7 and 8 form a drive system, and thereby the anode 101 is able to be successively conveyed from the take-up roller 7 to the take-up roller 8 and is able to be successively conveyed from the take-up roller 8 to the take-up roller 7. FIG. 3 corresponds to a state in which the anode current collector 101 moves from the take-up roller 7 toward the take-up roller 8, and the arrows in the drawing indicates the direction in which the anode current collector 101 moves. Further, the feed roller 16 is also a drive system in the evaporation apparatus.

The can rolls 40A and 40B are, for example, cylindrical rotating bodies (drums) for holding the anode current collector 101. The can rolls 40A and 40B rotate (autorotation), and thereby parts of the respective outer periphery faces thereof enter the evaporation source setting chambers 20A and 20B to oppose the evaporation sources 30A and 30B. Here, parts 41A and 41B of the outer periphery faces of the can rolls 40A and 40B that enter the evaporation setting chambers 20A and 20B form evaporation regions on which thin films are formed by the evaporation materials 32A and 32B from the evaporation sources 30A and 30B.

The evaporation sources 30A and 30B are, for example, that in which the evaporation materials 32A and 32B containing monocrystal silicon and carbon are contained in the crucibles 31A and 31B made of boron nitride (BN), and the evaporation materials 32A and 32B are evaporated (vaporized) by being heated. Specifically, the evaporation sources 30A and 30B further include, for example, an electron gun (not shown), and thermal electrons discharged by the electron gun being driven are irradiated onto the evaporation materials 32A and 32B contained in the crucibles 31A and 31B, while the range is electromagnetically controlled by, for example, a deflection yoke (not shown). The evaporation materials 32A and 32B are heated by being irradiated thermal electrons from the electron gun and gradually evaporate after melting.

The crucibles 31A and 31B are composed of, for example, an oxide such as titanium oxide, tantalum oxide, zirconium oxide, and silicon oxide, in addition to boron nitride. The crucibles 31A and 31B may be structured so that a part of its periphery (such as the bottom face) contacts a cooling system (not shown) for protection from excessive temperature rise of the crucibles 31A and 31B associated with the irradiation of thermal electrons onto the evaporation materials 32A and 32B. As the cooling system, for example, a cooling apparatus using a water-cooling method, such as a water jacket, is suitable.

The shutters 60A and 60B are arranged between the evaporation sources 30A and 30B and the can rolls 40A and 40B, and is a mechanism capable of opening and closing to control passage of the evaporation materials 32A and 32B in a vapor-phase state moving from the crucibles 31A and 31B to the anode current collector 101 held by the can rolls 40A and 40B. That is, the shutters 60A and 60B are open during evaporation treatment and allows passage of the evaporation materials 32A and 32B in the vapor-phase state that evaporate from the crucibles 31A and 31B, while blocking the passage before and after evaporation treatment. The shutters 60A and 60B are connected to a control circuit system (not shown), and is driven by a command signal instructing an open state or a closed state being inputted.

To manufacture the anode of the embodiment using the evaporation apparatus, the following is performed. Specifically, first, a roll of the anode current collector 101 is attached to the take-up roller 7, and its end on the outer periphery side is pulled outward and attached to an engaging section (not shown) of the take-up roller 8 by way of the guide roller 11, the can roll 40A, the guide roller 12, the feed roller 16, the guide roller 13, the guide roller 14, the can roller 40B, and the guide roller 15.

Next, ventilation is performed by the vacuum ventilation device 17 so that the degree of vacuum within the evaporation treatment bath 20 becomes a given value (such as about $10^{-3}$ Pa). At this point, the shutters 60A and 60B are closed. While the shutters 60A and 60B remain closed, the evaporation materials 32A and 32B contained in the crucibles 31A and 31B are heated and evaporation (vaporizing) thereof is started. In this state, observation of the evaporation rate of the evaporation materials 32A and 32B contained in the crucibles 31A and 31B is started by a liquid crystal monitor or the like (not shown), and judgment is made regarding whether the evaporation rate has reached a target value upon elapse of a given amount of time from the start of evaporation, and whether the evaporation rate is stable. In the case where it is confirmed that the evaporation rate has reached the target value and is stable, the take-up roller 8 and the like are driven while introducing a given amount of oxygen gas to the evaporation treatment bath 20, and thereby moving of the anode current collector 101 is started and the shutters 60A and 60B are opened. Thereby, the vaporized evaporation materials 32A and 32B pass through the open shutters 60A and 60B and reach the anode current collector 101 held by the can rolls 40A and 40B, and evaporation onto both faces of the anode current collector 101 is started. In the result, the anode active material layer 102 having a given thickness is able to be formed by the moving speed of the anode current collector 101 and the evaporation rate of the evaporation materials 32A and 32B being adjusted.

Here, a case where the anode active material layer 102 is formed on the anode current collector 101 while moving the anode current collector 101 from the take-up roller 7 to the take-up roller 8 (referred to, for convenience, as forward direction movement) is described. However, the anode active material layer 102 may be formed by reverse direction movement, that is, by moving the anode current collector 101 from the take-up roller 8 toward the take-up roller 7. In this case, it is enough that the take-up rollers 7 and 8, the guide rollers 11 to 15, the feed roller 16, and the can rolls 40A and 40B are rotated in the reverse direction. Also, formation of the anode active material layer 102 is performed by moving the anode current collector 101 a plurality of number of times.

The shape of the anode active material fibers 4 is able to be changed accordingly mainly by adjusting the incident angle of the evaporation materials 32A and 32B evaporated from the evaporation sources 30A and 30B to the anode current collector 101. The incident angle is adjusted depending on, for example, the size of the openings 18A and 18B provided in the partition plate 18, and the relative positions of the can rolls 40A and 40B, the openings 18A and 18B, and the evaporation sources 30A and 30B, in addition to the radius of curvature of the anode current collector 101 at the positions corresponding to the parts 41A and 41B on the outer periphery faces of the can rollers 40A and 40B (hereinafter referred to as the "evaporation positions"). The radius of curvature of the anode current collector 101 at the evaporation positions are able to be changed depending on, for example, the radius of curvature of the can rolls 40A and 40B, or the relative positions of the guide rollers 11 to 15 to the can rolls 40A and 40B.

Operation and Effect of this Embodiment

As described above, in the anode 10 of this embodiment, the anode active material layer 102 includes a plurality of anode active material fibers 4 of which silicon is an element. Therefore, stress resulting from expansion and shrinkage at the time of charge and discharge in the anode active material layer 102 is relaxed. In particular, since the anode active material fibers 4 are S-shaped and the oxygen-containing region 3 is included, sufficient stress relaxing effect is obtained, and expansion and shrinkage of the anode active material layer 102 is further inhibited. Therefore, structural breakage of the anode active material layer 102 is inhibited, and contact characteristics between each layer in the multi-layer structure, contact characteristics between the anode active material layer 102 and the anode current collector 101, and current collectivity are improved. Therefore, in the case where the anode 10 is applied to a lithium ion secondary battery, while a high capacity is realized by using silicon as an anode active material, superior cycle characteristics are also able to be obtained.

FIG. 2 illustrates an example in which the first region 1 and the second region 2 have the same thickness. However, this is not limited thereto. In addition, the anode active material layer 102 may contain a binder, an electrical conductor, and the like in addition to the anode active material, according to needs.

Figure 4A:
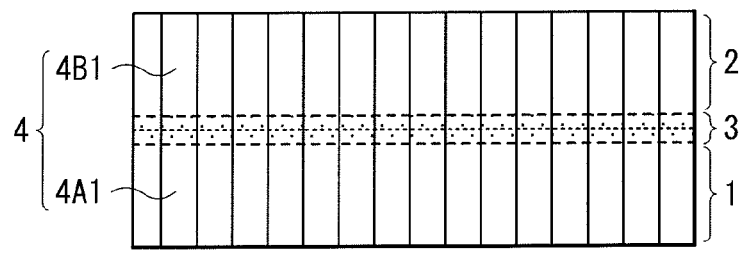
FIG. 4A to FIG. 4E are pattern diagrams of cross sections illustrating variation examples related to the shape of anode active material fibers in the anode for a lithium ion secondary battery illustrated in FIG. 1.
Figure 4B:
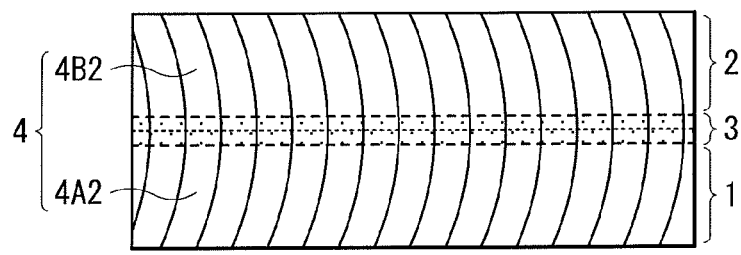
Figure 4C:
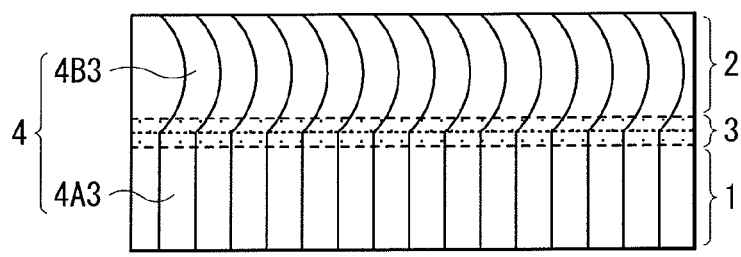
Figure 4D:
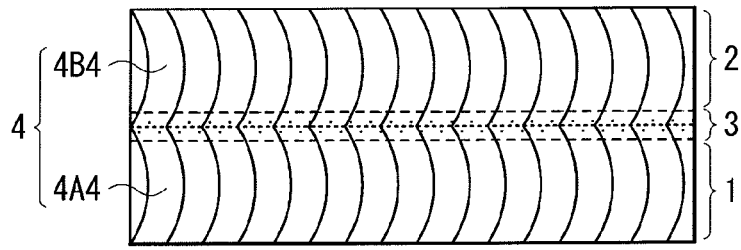
Figure 4E:
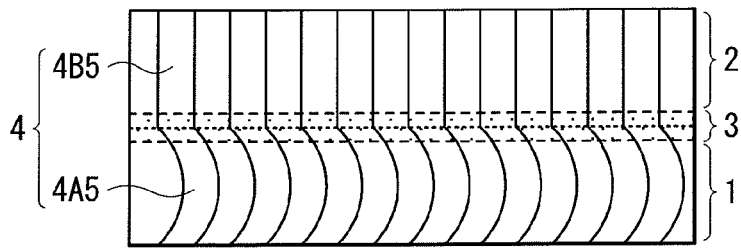

In the embodiment, the shape of the anode active material fiber 4 is an S-shape. However, the present application is not limited thereto. The anode active material fiber 4 may have other shapes such as those illustrated as pattern diagrams in FIG. 4A to FIG. 4E. Specifically, FIG. 4A illustrates an example in which the anode active material fiber 4 is composed of a pair of straight line sections 4A1 and 4B1 that are linked together. FIG. 4B illustrates an example in which the anode active material fiber 4 is composed of a pair of curvature sections 4A2 and 4B2 that are linked together to form a continuous curved line. FIG. 4C illustrates an example in which the anode active material fiber 4 is composed of one straight line section 4A3 and one curvature section 4B3 that are arranged in sequence from the anode current collector 101 side and linked together. FIG. 4D illustrates an example in which the anode active material fiber 4 is composed of a curvature section 4A4 and a curvature section 4B4 that are linked together to form a discontinuous curved line. In this case, the curvature section 4A4 and the curvature section 4B4 are curved in the same direction. FIG. 4E illustrates an example in which the anode active material fiber 4 is composed of one curvature section 4A5 and one straight line section 4B5 that are arranged in sequence from the anode current collector 101 side and linked together. Stress relaxing effect is able to be obtained to a certain degree even in the case where the anode active material fiber 4 has the foregoing shapes.

2. Second embodiment

Structure of an Anode

Figure 5:
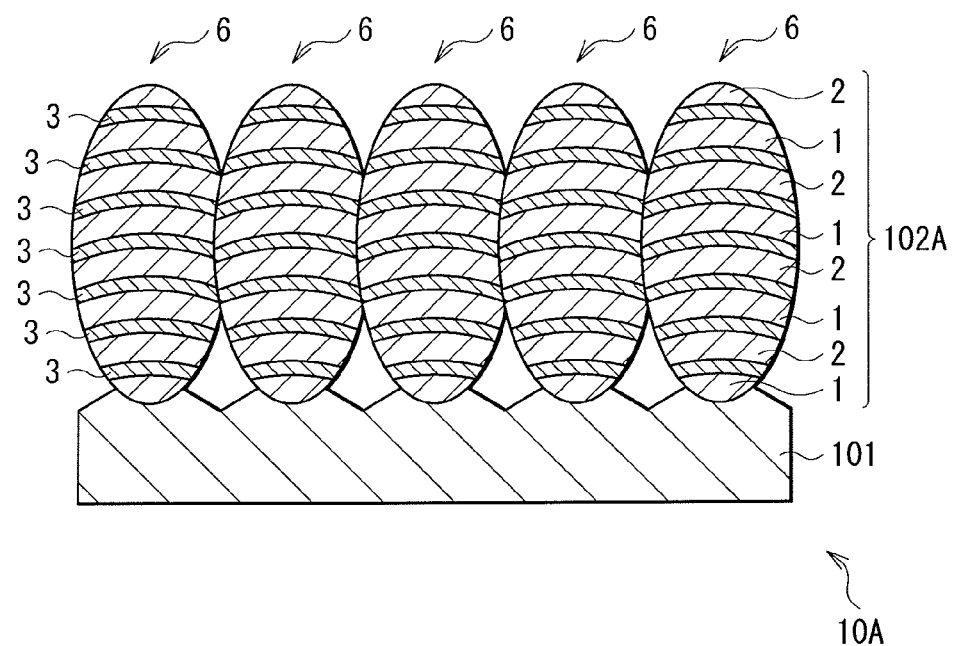
FIG. 5 is a schematic cross sectional view illustrating an anode for a lithium ion secondary battery as a second embodiment.

FIG. 5 schematically illustrates a cross sectional structure of a main section of an anode 10A as a second embodiment. The anode 10A is used for a lithium ion secondary battery as the anode 10 of the foregoing first embodiment is. In the following description, structures, operations, and effects of the elements substantially identical with those of the foregoing anode 10 will be omitted.

As illustrated in FIG. 5, the anode 10A has a structure in which an anode active material layer 102A containing a plurality of anode active material particles 6 is provided on the anode current collector 101. Each anode active material particle 6 extends in the thickness direction of the anode active material layer 102A so as to stand on the anode current collector 101. Further, each anode active material particle 6 has a multilayer structure including in each layer a plurality of the anode active material fiber 4 portions similar to that of the first embodiment. In FIG. 5, an illustration of the anode active material fibers 4 is omitted. In this case as well, the anode active material fiber 4 is preferably formed by a pair of curvature sections that curve in opposite directions being linked in the oxygen-containing region 3, and extends in the thickness direction of the anode active material layer 102A while snaking to repeatedly form the S-shape. That is, the anode active material particle 6 has a multilayer structure in which the laminar first region 1 including one curvature section, the oxygen-containing region 3, the laminar second region 2 including the other curvature section, and the oxygen-containing region 3 are repeatedly layered in sequence. The numbers of layers of the first region 1 and the second region 2 in the multilayer structure are not limited to those illustrated in FIG. 5, and are able to be selected accordingly. In the embodiment as well, the shape of the anode active material fiber 4 is not limited to the S-shape and may be other shapes, such as those illustrated in FIG. 4A to FIG. 4E.

Manufacturing Method of the Anode

The anode active material particles 6 are formed by, for example, one of vapor-phase deposition method, liquid-phase deposition method, spraying method, and firing method, or two or more methods thereof as in the foregoing first embodiment. In particular, vapor-phase deposition method is preferably used, since thereby the anode current collector 101 and the anode active material particles 6 are easily alloyed in the interface thereof. Alloying may be made by diffusing an element of the anode current collector 101 into the anode active material particles 6; or vice versa. Otherwise, alloying may be made by diffusion of the element of the anode current collector 101 and silicon as an element of the anode active material particles 6 into each other. Due to such alloying, structural breakage of the anode active material particles 6 resulting from expansion and shrinkage at the time of charge and discharge is inhibited, and the electric conductivity between the anode current collector 101 and the anode active material particles 6 is improved.

Operation and Effect of this Embodiment

As described above, in the anode 10A in this embodiment, the anode active material particles 6 structuring the anode active material layer 102A provided on the anode current collector 101 are formed as the multilayer structure including a plurality of anode active material fibers 4 in each layer. Thereby, stress generated by expansion and shrinkage at the time of charge and discharge in the anode active material layer 102A is relaxed. Therefore, structural breakage of the anode active material layer 102A is inhibited, and contact characteristics between each layer in the multilayer structure, contact characteristics between the anode active material layer 102A and the anode current collector 101, and current collectivity are improved. Therefore, effect similar to that of the foregoing first embodiment is obtained.

3. Third Embodiment

Next, a description will be given of usage examples of the anodes 10 and 10A described in the foregoing first and the second embodiments. A description will be given, as an example, taking a first secondary battery to a third secondary battery as a lithium ion secondary battery for which the anodes 10 and 10A are used.

3-1. First Secondary Battery (Cylindrical Type)

Figure 6:
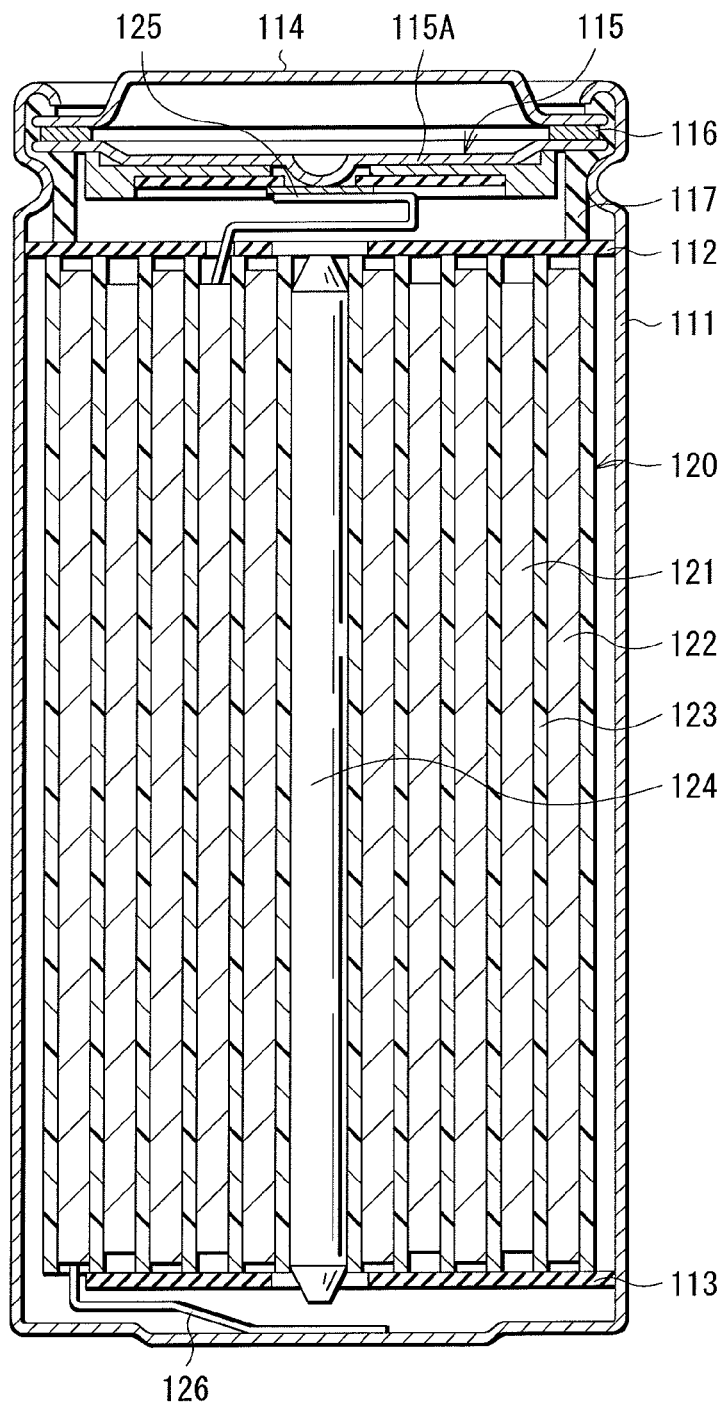
FIG. 6 is a cross sectional view illustrating a structure of a first secondary battery using the anode for a lithium ion secondary battery.
Figure 7:
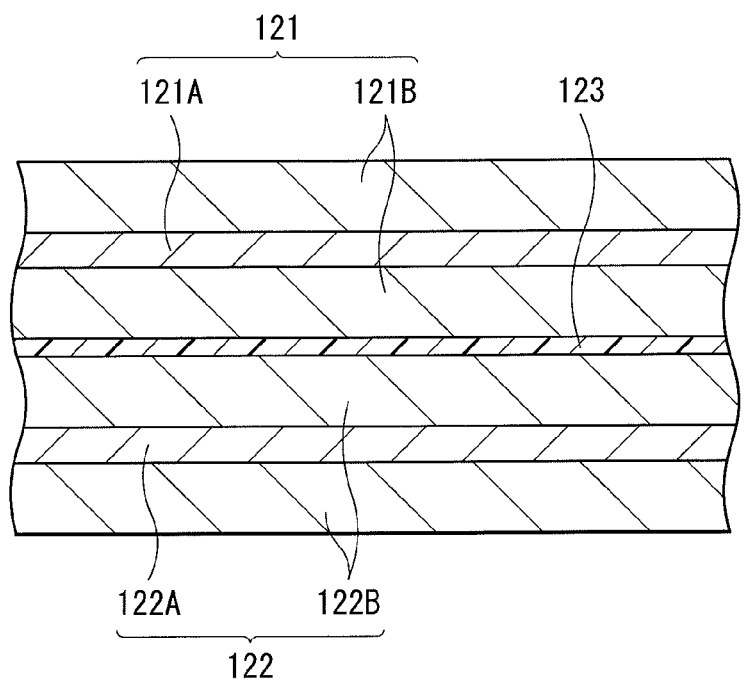
FIG. 7 is a cross sectional view illustrating an enlarged part of the spirally wound electrode body illustrated in FIG. 6.

FIG. 6 and FIG. 7 illustrate a cross sectional structure of a first secondary battery. FIG. 7 illustrates an enlarged part of a spirally wound electrode body 120 illustrated in FIG. 6. The secondary battery herein described is, for example, a lithium ion secondary battery in which, for example, a capacity of an anode 122 is expressed based on insertion and extraction of lithium.

Whole Structure of the First Secondary Battery

The secondary battery mainly contains the spirally wound electrode body 120 in which a cathode 121 and the anode 122 are layered with a separator 123 in between and spirally wound, and a pair of insulating plates 112 and 113 inside a battery can 111 in the shape of an approximately hollow cylinder. The battery structure including the battery can 111 is a so-called cylindrical type.

The battery can 111 is made of, for example, a metal material such as iron, aluminum, or an alloy thereof. One end of the battery can 111 is closed, and the other end of the battery can 111 is opened. The pair of insulating plates 112 and 113 is arranged to sandwich the spirally wound electrode body 120 in between and to extend perpendicularly to the spirally wound periphery face.

At the open end of the battery can 111, a battery cover 114, and a safety valve mechanism 115 and a PTC (Positive Temperature Coefficient) device 116 provided inside the battery cover 114 are attached by being caulked with a gasket 117. Inside of the battery can 111 is thereby hermetically sealed. The battery cover 114 is made of, for example, a material similar to that of the battery can 111. The safety valve mechanism 115 is electrically connected to the battery cover 114 through the PTC device 116. In the safety valve mechanism 115, in the case where the internal pressure becomes a certain level or more by internal short circuit, external heating or the like, a disk plate 115A flips to cut the electric connection between the battery cover 114 and the spirally wound electrode body 120. As temperature rises, the PTC device 116 increases the resistance and thereby limits a current to prevent abnormal heat generation resulting from a large current. The gasket 117 is made of, for example, an insulating material. The surface of the gasket 117 is coated with asphalt.

A center pin 124 may be inserted in the center of the spirally wound electrode body 120. In the spirally wound electrode body 120, a cathode lead 125 made of a metal material such as aluminum is connected to the cathode 121, and an anode lead 126 made of a metal material such as nickel is connected to the anode 122. The cathode lead 125 is electrically connected to the battery cover 114 by being welded to the safety valve mechanism 115. The anode lead 126 is welded and thereby electrically connected to the battery can 111.

Cathode

The cathode 121 has a structure in which, for example, a cathode active material layer 121B is provided on both faces of a cathode current collector 121A having a pair of faces. The cathode current collector 121A is made of a metal material such as aluminum, nickel, and stainless steel. The cathode active material layer 121B contains a cathode active material, and may contain other material such as a binder and an electrical conductor according to needs.

The cathode active material contains one or more cathode materials capable of inserting and extracting lithium as an electrode reactant. As the cathode material, for example, a lithium-containing compound is preferable, since thereby a high energy density is able to be obtained. Examples of the lithium-containing compound include a composite oxide containing lithium and a transition metal element and a phosphate compound containing lithium and a transition metal element. Specially, a compound containing at least one selected from the group consisting of cobalt, nickel, manganese, and iron as a transition metal element is preferable, since thereby a higher voltage is able to be obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state of the secondary battery, and are generally in the range of $0.05 \leq x \leq 1.10$ and $0.05 \leq y \leq 1.10$.

Examples of composite oxides containing lithium and a transition metal element include a lithium cobalt composite oxide ($Li_xCoO_2$), a lithium nickel composite oxide ($Li_xNiO_2$), a lithium nickel cobalt composite oxide ($Li_xNi_{(1-z)}Co_zO_2$ (z<1)), a lithium nickel cobalt manganese composite oxide ($Li_xNi_{(1-v-w)}Co_vMn_wO_2$ (v+w<1)), and lithium manganese composite oxide having a spinel structure ($LiMn_2O_4$). Specially, a composite oxide containing cobalt is preferable, since thereby a high capacity is obtained and superior cycle characteristics are obtained. Further, examples of phosphate compounds containing lithium and a transition metal element include lithium iron phosphate compound ($LiFePO_4$) and a lithium iron manganese phosphate compound ($LiFe_{(1-u)}Mn_uPO_4$ (u<1)).

In addition, examples of cathode materials include an oxide, a disulfide, a chalcogenide, and a conductive polymer. Examples of oxides include titanium oxide, vanadium oxide, and manganese dioxide. Examples of disulfides include titanium disulfide and molybdenum sulfide. Examples of chalcogenide include niobium selenide. Examples of conductive polymers include sulfur, polyaniline and polythiophene.

It is needless to say that the cathode material may be a material other than the foregoing compounds. Further, two or more of the foregoing cathode materials may be used by mixture arbitrarily.

Examples of cathode binders include a synthetic rubber such as styrene-butadiene rubber, fluorine system rubber, and ethylene propylenediene, and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. One thereof may be used singly, or a plurality thereof may be used by mixture. The cathode electrical conductor may be a metal material, a conductive polymer or the like as long as the material has electric conductivity.

Anode

The anode 122 has a structure similar to those of the foregoing anode 10 or 10A. For example, in the anode 122, an anode active material layer 122B is provided on both faces of an anode current collector 122A having a pair of faces. The structures of the anode current collector 122A and the anode active material layer 122B are respectively similar to the structures of the anode current collector 101 and the anode active material layer 102 in the foregoing anode. In the anode 122, the chargeable capacity of the anode material capable of inserting and extracting lithium is preferably larger than the chargeable capacity of the cathode 121. Thereby, at the time of full charge, there is low possibility that lithium is precipitated as dendrite on the anode 122.

Separator

The separator 123 separates the cathode 121 from the anode 122, and passes lithium ions while preventing current short circuit due to contact of both electrodes. The separator 123 is made of, for example, a porous film composed of a synthetic resin such as polytetrafluoroethylene, polypropylene, and polyethylene, or a ceramics porous film. The separator 123 may have a structure in which two or more porous films are layered. Specially, a porous film made of polyolefin is preferable, since such a film has superior short circuit preventive effect, and is able to achieve safety improvement of the secondary battery by shutdown effect. In particular, polyethylene is preferable since shutdown effect is able to be thereby obtained at from 100 deg C. to 160 deg C. both inclusive and its electrochemical stability is excellent. Further, polypropylene is also preferable. In addition, a copolymer of polyethylene and polypropylene or a blended material thereof may be used as long as such a resin has chemical stability.

Electrolytic Solution

An electrolytic solution as a liquid electrolyte impregnating the separator 123. The electrolytic solution contains a solvent and an electrolyte salt dissolved therein.

The solvent contains, for example, one or more nonaqueous solvents such as an organic solvent. The solvents (nonaqueous solvents) described below may be used singly or two or more thereof may be used by mixture.

Examples of nonaqueous solvents include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethylacetic acid methyl, trimethylacetic acid ethyl, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. By using such a nonaqueous solvent, a superior battery capacity, superior cycle characteristics, superior storage characteristics and the like are obtained.

Specially, at least one of ethylene carbonate, propylene carbonate, dimethyl carbonate, diethyl carbonate, and ethyl methyl carbonate is preferable. By using such a nonaqueous solvent, a superior battery capacity, superior cycle characteristics, superior storage characteristics and the like are obtained. In this case, a mixture of a high viscosity (high dielectric constant) solvent (for example, specific inductive $\epsilon \geq 30$) such as ethylene carbonate and propylene carbonate and a low viscosity solvent (for example, viscosity≤1 mPa·s) such as dimethyl carbonate, ethylmethyl carbonate, and diethyl carbonate is more preferable. Thereby, dissociation characteristics of the electrolyte salt and ion mobility are improved.

In particular, the solvent preferably contains at least one of a halogenated chain ester carbonate and a halogenated cyclic ester carbonate. Thereby, a stable protective film is formed on the surface of the anode 122 at the time of charge and discharge, and thus decomposition of the electrolytic solution is inhibited. The halogenated chain ester carbonate is a chain ester carbonate having halogen as an element. More specifically, at least part of hydrogen in the chain ester carbonate is substituted with halogen. Further, the halogenated cyclic ester carbonate is a cyclic ester carbonate containing halogen as an element. More specifically, at least part of hydrogen in the cyclic ester carbonate is substituted with halogen.

The halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and more stable protective film is formed. Accordingly, decomposition reaction of the electrolytic solution is further inhibited.

Examples of the halogenated chain ester carbonate include fluoromethyl methyl carbonate, bis(fluoromethyl) carbonate, and difluoromethyl methyl carbonate. Examples of the halogenated cyclic ester carbonate include 4-fluoro-1,3-dioxo lane-2-one and 4,5-difluoro-1,3-dioxo lane-2-one. Halogenated cyclic ester carbonate includes a geometric isomer as well. Contents of the halogenated chain ester carbonate and the halogenated cyclic ester carbonate in the solvent is, for example, from 0.01 wt % to 50 wt % both inclusive.

Further, the solvent preferably contains an unsaturated carbon bond cyclic ester carbonate. Thereby, a stable protective film is formed on the surface of the anode 42 at the time of charge and discharge, and thus decomposition reaction of the electrolytic solution is inhibited. The unsaturated carbon bond cyclic ester carbonate is a cyclic ester carbonate having an unsaturated carbon bond. More specifically, unsaturated carbon bond is introduced to a certain location of the cyclic ester carbonate. Examples of the unsaturated carbon bond cyclic ester carbonate include vinylene carbonate and vinylethylene carbonate. Contents of the unsaturated carbon bond cyclic ester carbonate in the solvent is, for example, from 0.01 wt % to 10 wt % both inclusive.

Further, the solvent preferably contains sultone (cyclic sulfonic ester), since thereby chemical stability of the electrolytic solution is improved. Examples of the sultone include propane sultone and propene sultone. The sultone content in the solvent is, for example, from 0.5 wt % to 5 wt % both inclusive.

Further, the solvent preferably contains an acid anhydride since chemical stability of the electrolytic solution is thereby improved. Examples of acid anhydrides include carboxylic anhydride, disulfonic anhydride, and carboxylic sulfonic anhydride. Examples of carboxylic anhydrides include succinic anhydride, glutaric anhydride, and maleic anhydride. Examples of disulfonic anhydrides include ethane disulfonic anhydride and propane disulfonic anhydride. Examples of carboxylic sulfonic anhydrides include sulfobenzoic anhydride, sulfopropionic anhydride, and sulfobutyric anhydride. The content of the acid anhydride in the solvent is, for example, from 0.5 wt % to 5 wt % both inclusive.

The electrolyte salt contains, for example, one or more light metal salts such as a lithium salt. The electrolyte salts described below may be used singly or two or more thereof may be used by mixture.

Examples of lithium salts include lithium hexafluorophosphate ($LiPF_6$), lithium tetrafluoroborate ($LiBF_4$), lithium perchlorate ($LiClO_4$), and lithium hexafluoroarsenate ($LiAsF_6$). Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride ($LiCl$), and lithium bromide ($LiBr$). In the case of using the foregoing material, superior battery capacity, superior cycle characteristics, superior storage characteristics and the like are obtained.

Specially, at least one of lithium hexafluorophosphate, lithium tetrafluoroborate, lithium perchlorate, and lithium hexafluoroarsenate is preferable. Further, lithium hexafluorophosphate and lithium tetrafluoroborate are more preferable, and lithium hexafluorophosphate is most preferable, since the internal resistance is thereby lowered, more superior effect is obtained.

The content of the electrolyte salt to the solvent is preferably from 0.3 mol/kg to 3.0 mol/kg both inclusive, since thereby high ion conductivity is obtained.

The electrolytic solution may contain various additives together with the solvent and the electrolyte salt, since thereby chemical stability of the electrolytic solution is further improved.

Examples of additives include sultone (cyclic ester sulfonate). Examples of sultone include propane sultone and propene sultone. Specially, propene sultone is preferable. Such sultone may be used singly, or a plurality thereof may be used by mixture.

Examples of additives include an acid anhydride. Examples of acid anhydrides include carboxylic anhydride such as succinic anhydride, glutaric anhydride, and maleic anhydride; disulfonic anhydride such as ethane disulfonic anhydride and propane disulfonic anhydride; and an anhydride of carboxylic acid and sulfonic acid such as sulfobenzoic anhydride, sulfopropionic anhydride, and sulfobutyric anhydride. Specially, sulfobenzoic anhydride or sulfopropionic anhydride is preferable. The anhydrides may be used singly, or a plurality thereof may be used by mixture.

Manufacturing Method of the Secondary Battery

The secondary battery is manufactured, for example, by the following procedure.

First, the cathode 121 is formed. First, a cathode active material, and if necessary, a cathode binder, a cathode electrical conductor or the like are mixed to prepare a cathode mixture, which is dispersed in an organic solvent to form a paste cathode mixture slurry. Subsequently, both faces of the cathode current collector 121A are uniformly coated with the cathode mixture slurry, which is dried to form the cathode active material layer 121B. Finally, the cathode active material layer 121B is compression-molded by using a rolling press machine or the like while being heated if necessary. In this case, the resultant may be compression-molded over several times.

Next, the anode 122 is formed by a procedure similar to that of the foregoing anode 10 or the like. In this case, after the anode current collector 122A is prepared, the anode active material layer 122B is formed by sequentially forming the first region, the oxygen-containing region, and the second region on both faces of the anode current collector 122A.

Finally, the secondary battery is assembled by using the cathode 121 and the anode 122. First, the cathode lead 125 is attached to the cathode current collector 121 by welding or the like, and the anode lead 126 is attached to the anode current collector 122A by welding or the like. Subsequently, the cathode 121 and the anode 122 are layered with the separator 123 in between and spirally wound, and thereby the spirally wound electrode body 120 is formed. After that, the center pin 124 is inserted in the center of the spirally wound electrode body. Subsequently, the spirally wound electrode body 120 is sandwiched between the pair of insulating plates 112 and 113, and contained in the battery can 111. In this case, the cathode lead 125 is attached to the safety valve mechanism 115 by welding or the like, and the anode lead 126 is attached to the battery can 111 by welding or the like. Subsequently, the electrolytic solution is injected into the battery can 111 and impregnates the separator 123. Finally, after the battery cover 114, the safety valve mechanism 115, and the PTC device 116 are attached to the open end of the battery can 111, the resultant is caulked with the gasket 117. Thereby, the secondary battery illustrated in FIG. 6 and FIG. 7 is completed.

Operation of the Secondary Battery

In the secondary battery, when charged, for example, lithium ions are extracted from the cathode 121 and inserted in the anode 122 through the electrolytic solution impregnating the separator 123. Meanwhile, when discharged, for example, lithium ions are extracted from the anode 122, and inserted in the cathode 121 through the electrolytic solution impregnating the separator 123.

Effect of the Secondary Battery

According to the first secondary battery, the anode 122 has the structure similar to that of the anode 10 illustrated in FIG. 1. Thus, the cycle characteristics are able to be improved while a high capacity is obtained. Effects of the first secondary battery other than the foregoing effects are similar to those of the foregoing anode 10.

3-2. Second Secondary Battery (Laminated Film Type)

Figure 8:
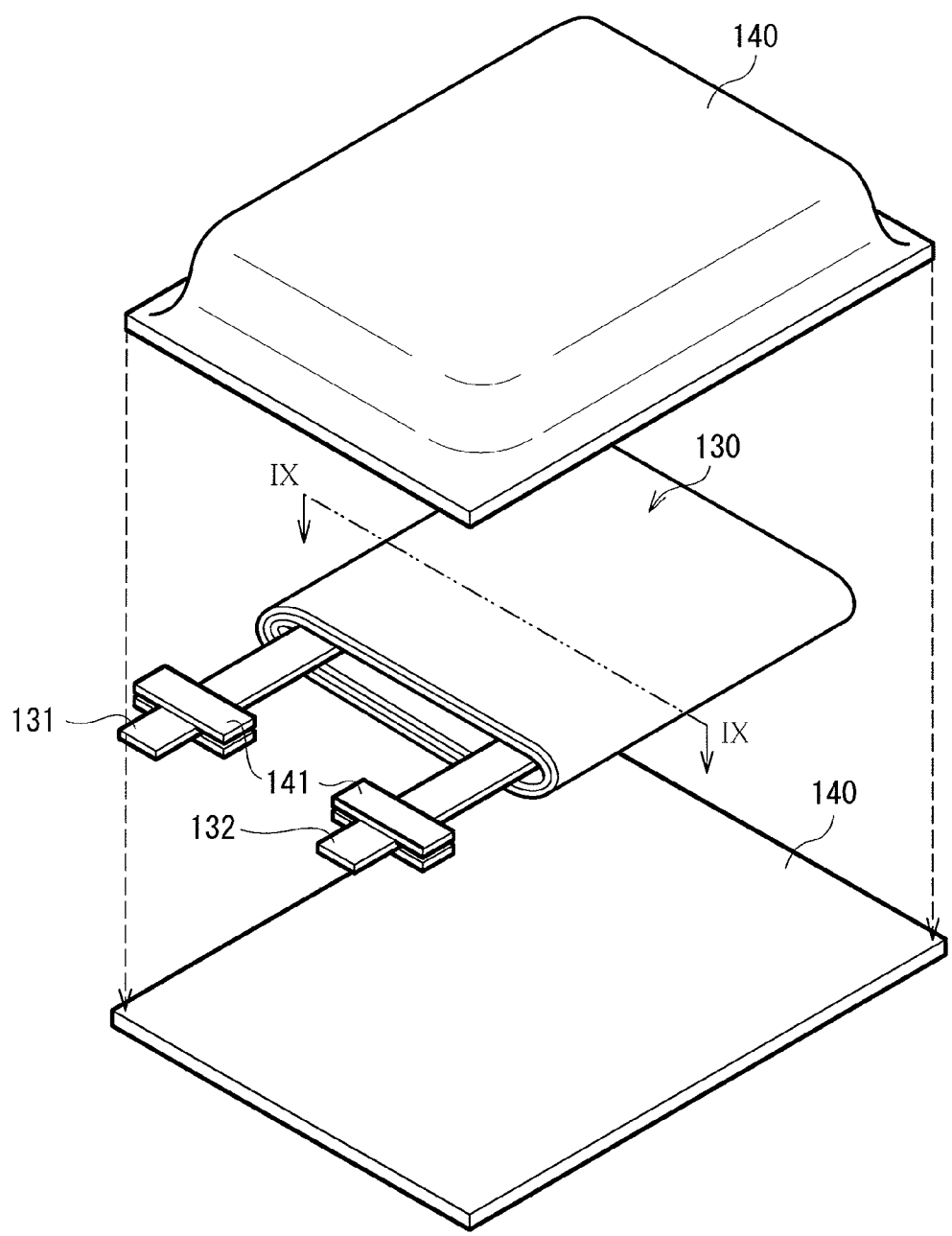
FIG. 8 is an exploded perspective view illustrating a structure of a second secondary battery using the anode for a lithium ion secondary battery.
Figure 9:
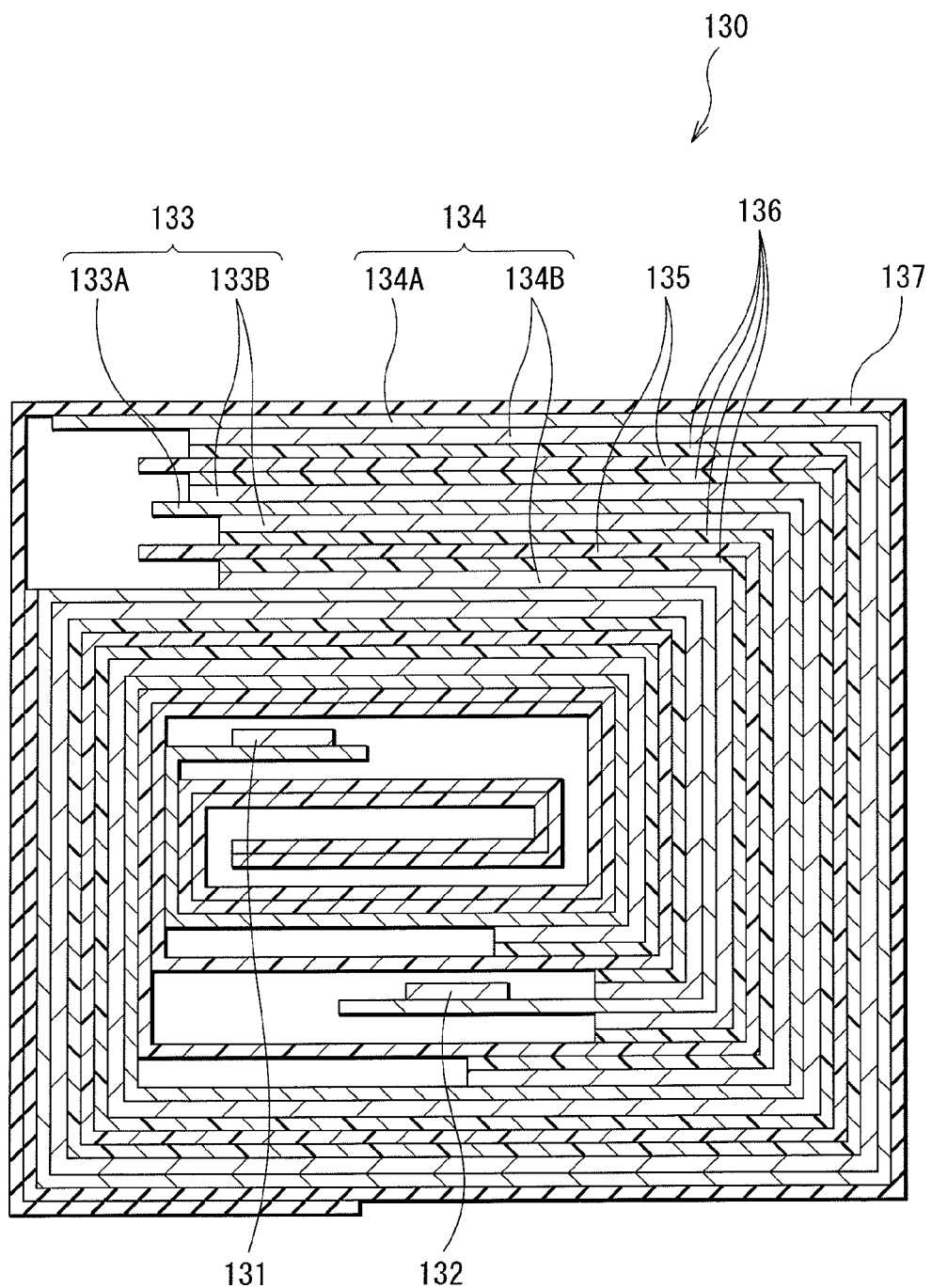
FIG. 9 is a cross sectional view illustrating a structure taken along line IX-IX of the spirally wound electrode body illustrated in FIG. 8.

FIG. 8 illustrates an exploded perspective structure of a second secondary battery. FIG. 9 illustrates an exploded cross section taken along line IX-IX of a spirally wound electrode body 130 illustrated in FIG. 8.

The secondary battery is, for example, a lithium ion secondary battery as the first secondary battery. In the second secondary battery, a spirally wound electrode body 130 on which a cathode lead 131 and an anode lead 132 are attached is contained in a film package member 140. The battery structure using the package member 140 is so-called laminated film type.

The cathode lead 131 and the anode lead 132 are respectively directed from inside to outside of the package member 140 in the same direction, for example. However, provision positions of the cathode lead 131 and the anode lead 132 in relation to the spirally wound electrode body 130, the derivation direction thereof and the like are not particularly limited. The cathode lead 131 is made of, for example, aluminum or the like, and the anode lead 132 is made of, for example, copper, nickel, stainless steel or the like. These materials are in the shape of a thin plate or mesh.

The package member 140 is a laminated film in which, for example, a fusion bonding layer, a metal layer, and a surface protective layer are layered in this order. In this case, for example, the respective outer edges in the fusion bonding layer of two films are bonded to each other by fusion bonding, an adhesive or the like so that the fusion bonding layer and the spirally wound electrode body 130 are opposed to each other. Examples of fusion bonding layers include a film made of polyethylene, polypropylene or the like. Examples of metal layers include an aluminum foil. Examples of surface protective layers include a film made of nylon, polyethylene terephthalate or the like.

Specially, as the package member 140, an aluminum laminated film in which a polyethylene film, an aluminum foil, and a nylon film are layered in this order is preferable. However, the package member 140 may be made of a laminated film having other laminated structure, a polymer film such as polypropylene, or a metal film instead of the foregoing aluminum laminated film.

An adhesive film 141 to protect from entering of outside air is inserted between the package member 140 and the cathode lead 131, the anode lead 132. The adhesive film 141 is made of a material having contact characteristics to the cathode lead 131 and the anode lead 132. Examples of such a material include, for example, a polyolefin resin such as polyethylene, polypropylene, modified polyethylene, and modified polypropylene.

In the spirally wound electrode body 130, as illustrated in FIG. 9, a cathode 133 and an anode 134 are layered with a separator 135 and an electrolyte layer 136 in between and spirally wound. The outermost periphery thereof is protected by a protective tape 137. The cathode 133 has a structure in which, for example, a cathode active material layer 133B is provided on both faces of a cathode current collector 133A. The anode 134 has a structure in which, for example, an anode active material layer 134B is provided on both faces of an anode current collector 134A.

Figure 10:
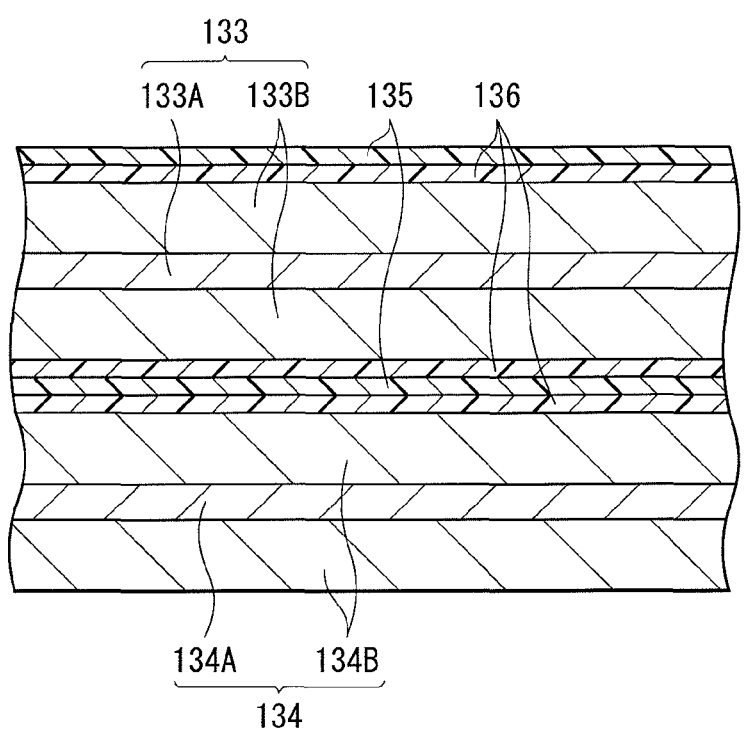
FIG. 10 is a cross sectional view illustrating an enlarged part of the spirally wound electrode body illustrated in FIG. 9.

FIG. 10 illustrates an enlarged part of the spirally wound electrode body 130 illustrated in FIG. 9. The cathode 133 has a structure in which, for example, the cathode active material layer 133B is provided on both faces of the cathode current collector 133A having a pair of faces. The anode 134 has a structure similar to that of the foregoing anode in which, for example, the anode active material layer 134B is provided on both faces of the anode current collector 134A having a pair of faces. The structures of the cathode current collector 133A, the cathode active material layer 133B, the anode current collector 134A, the anode active material layer 134B, and the separator 135 are respectively similar to those of the cathode current collector 121A, the cathode active material layer 121B, the anode current collector 122A, the anode active material layer 122B, and the separator 123 in the foregoing first secondary battery.

In the electrolyte layer 136, an electrolytic solution is held by a polymer compound. The electrolyte layer 136 may contain other material such as various additives according to needs. The electrolyte layer 136 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include one or more of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further, examples thereof include a copolymer of vinylidene fluoride and hexafluoropropylene. Such a compound may be used singly, or a plurality thereof may be used by mixture. Specially, polyvinylidene fluoride or the copolymer of vinylidene fluoride and hexafluoropropylene is preferable, since such a polymer compound is electrochemically stable.

The composition of the electrolytic solution is similar to the composition of the electrolytic solution in the first secondary battery. However, in the electrolyte layer 136 as the gel electrolyte, a solvent of the electrolytic solution means a wide concept including not only the liquid solvent but also a material having ion conductivity capable of dissociating the electrolyte salt. Therefore, in the case where the polymer compound having ion conductivity is used, the polymer compound is also included in the solvent.

Instead of the gel electrolyte layer 136 in which an electrolytic solution is held by the polymer compound, the electrolytic solution may be directly used. In this case, the electrolytic solution impregnates the separator 135.

The secondary battery including the gel electrolyte layer 136 is manufactured, for example, by the following three procedures.

In the first manufacturing method, first, the cathode 133 and the anode 134 are formed by procedures similar to those of the cathode 121 and the anode 122 in the first secondary battery. Specifically, the cathode 133 is formed by forming the cathode active material layer 133B on both faces of the cathode current collector 133A, and the anode 134 is formed by forming the anode active material layer 134B on both faces of the anode current collector 134A. Subsequently, a precursor solution containing an electrolytic solution, a polymer compound, and a solvent is prepared. After the cathode 133 and the anode 134 are coated with the precursor solution, the solvent is volatilized to form the gel electrolyte layer 136. Subsequently, the cathode lead 131 is attached to the cathode current collector 133A by welding or the like, and the anode lead 132 is attached to the anode current collector 134A by welding or the like. Subsequently, the cathode 133 and the anode 134 provided with the electrolyte layer 136 are layered with the separator 135 in between and spirally wound. After that, the protective tape 137 is adhered to the outermost periphery thereof to form the spirally wound electrode body 130. Finally, after the spirally wound electrode body 130 is sandwiched between 2 pieces of the film package members 140, outer edges of the package members 140 are bonded by thermal fusion bonding or the like to enclose the spirally wound electrode body 130. At this time, the adhesive films 141 are inserted between the cathode lead 131, the anode lead 132 and the package member 140. Thereby, the secondary battery illustrated in FIG. 8 to FIG. 10 is completed.

In the second manufacturing method, first, the cathode lead 131 is attached to the cathode 133, and the anode lead 132 is attached to the anode 134. Subsequently, the cathode 133 and the anode 134 are layered with the separator 135 in between and spirally wound. After that, the protective tape 137 is adhered to the outermost periphery thereof, and thereby a spirally wound body as a precursor of the spirally wound electrode body 130 is formed. Subsequently, after the spirally wound body is sandwiched between 2 pieces of the film package members 140, the outermost peripheries except for one side are bonded by thermal fusion bonding or the like to obtain a pouched state, and the spirally wound body is contained in the pouch-like package member 140. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 140. After that, the opening of the package member 140 is hermetically sealed by thermal fusion bonding or the like. Finally, the monomer is thermally polymerized to obtain a polymer compound. Thereby, the gel electrolyte layer 136 is formed. Accordingly, the secondary battery is completed.

In the third manufacturing method, the spirally wound body is formed and contained in the pouch-like package member 140 in the same manner as that of the foregoing second manufacturing method, except that the separator 135 with both faces coated with a polymer compound is used firstly. Examples of polymer compounds with which the separator 135 is coated include a polymer containing vinylidene fluoride as a component (a homopolymer, a copolymer, a multicomponent copolymer or the like). Specific examples include polyvinylidene fluoride, a binary copolymer containing vinylidene fluoride and hexafluoropropylene as a component, and a ternary copolymer containing vinylidene fluoride, hexafluoropropylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 140. After that, the opening of the package member 140 is sealed by thermal fusion bonding or the like. Finally, the resultant is heated while a weight is applied to the package member 140, and the separator 135 is contacted with the cathode 133 and the anode 134 with the polymer compound in between. Thereby, the electrolytic solution impregnates the polymer compound, and the polymer compound is gelated to form the electrolyte layer 136. Accordingly, the secondary battery is completed.

In the third manufacturing method, the swollenness of the secondary battery is inhibited compared to the first manufacturing method. Further, in the third manufacturing method, the monomer, the solvent and the like as a raw material of the polymer compound are hardly left in the electrolyte layer 136 compared to the second manufacturing method. Thus, the formation step of the polymer compound is favorably controlled. Therefore, sufficient contact characteristics are obtained between the cathode 133/the anode 134/the separator 135 and the electrolyte layer 136.

In the secondary battery, at the time of charge, for example, lithium ions are extracted from the cathode 133, and are inserted in the anode 134 through the electrolyte layer 136. Meanwhile, at the time of discharge, for example, lithium ions are extracted from the anode 134, and are inserted in the cathode 133 through the electrolyte layer 136.

According to the second secondary battery, the anode 134 has the structure similar to that of the anode 10 illustrated in FIG. 1. Thus, the cycle characteristics are able to be improved while a high capacity is obtained. Other effect of the second secondary battery is similar to that of the foregoing anode 10.

3-3. Third Secondary Battery (Square Type)

Figure 11:
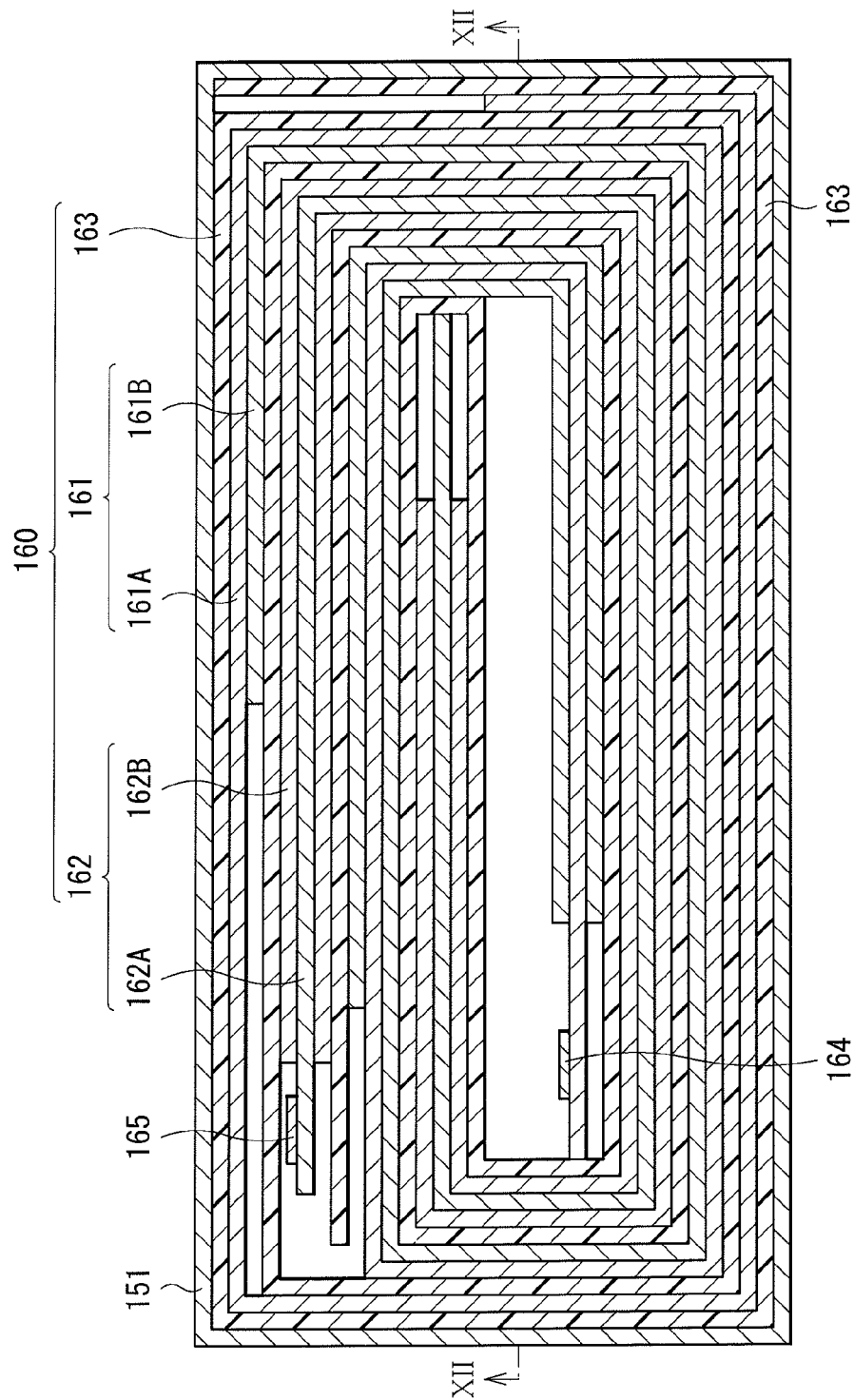
FIG. 11 is a cross sectional view illustrating a structure of a third secondary battery using the anode for a lithium ion secondary battery of the invention.
Figure 12:
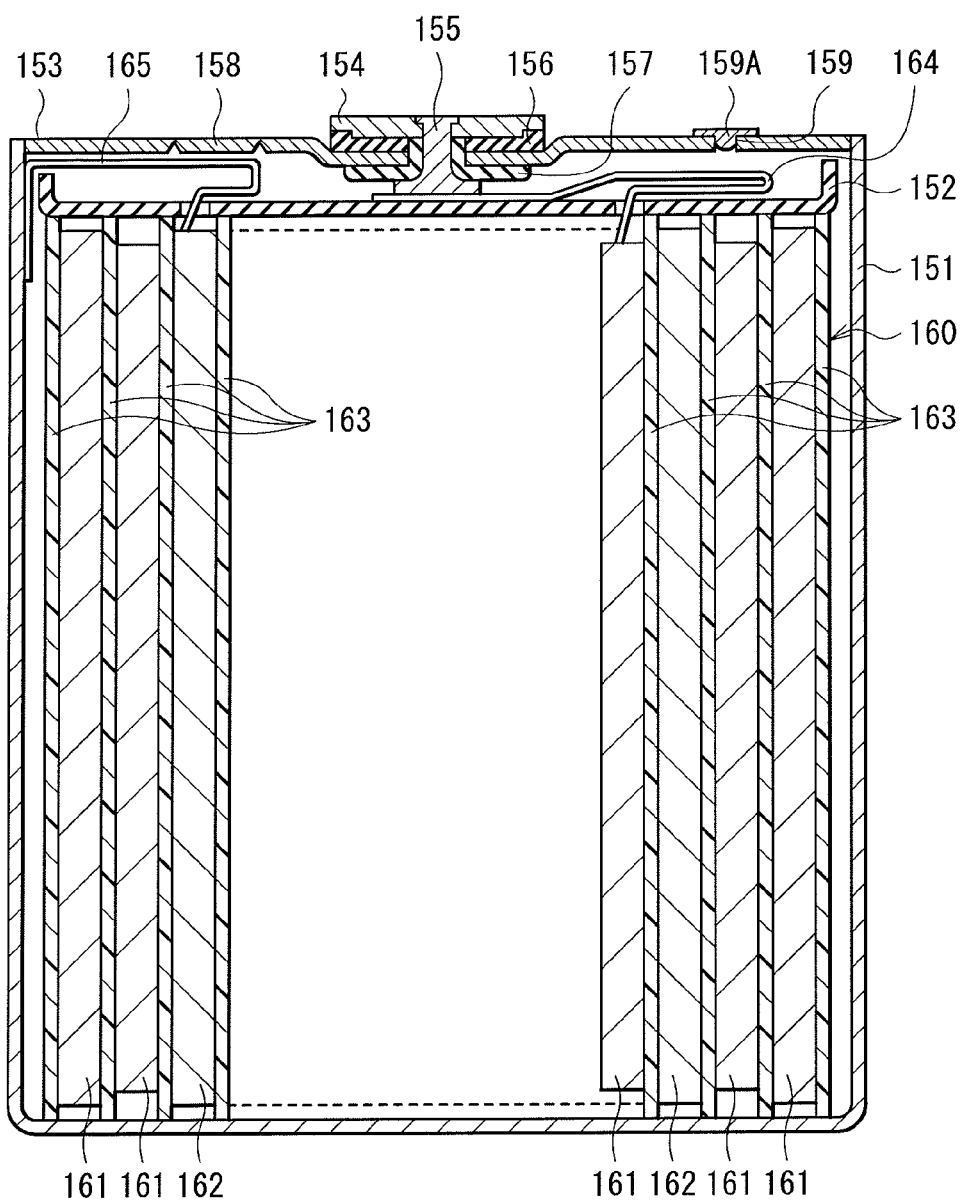
FIG. 12 is a cross sectional view illustrating a structure taken along line XII-XII of the spirally wound electrode body illustrated in FIG. 11.

FIG. 11 and FIG. 12 illustrate a cross sectional structure of a third secondary battery. The cross section illustrated in FIG. 11 and the cross section illustrated in FIG. 12 are perpendicular to each other as the positional relation. That is, FIG. 12 is a cross sectional view taken along line XII-XII illustrated in FIG. 11. The secondary battery is a so-called square type battery and is a lithium ion secondary battery in which a planar spirally wound electrode body 160 is contained in a package can 151 in the shape of an approximate hollow rectangular solid.

The package can 151 is made of, for example, iron (Fe) plated by nickel (Ni). The package can 151 also has a function as an anode terminal. One end of the package can 151 is closed and the other end of the package can 151 is opened. At the open end of the package can 151, an insulating plate 152 and a battery cover 153 are attached, and thereby inside of the battery can 151 is hermetically closed. The insulating plate 152 is made of, for example, polypropylene or the like, and is arranged perpendicular to the spirally wound circumferential face on the spirally wound electrode body 160. The battery cover 153 is, for example, made of a material similar to that of the battery can 151, and also has a function as an anode terminal together with the package can 151. Outside of the battery cover 153, a terminal plate 154 as a cathode terminal is arranged. In the approximate center of the battery cover 153, a through-hole is provided. A cathode pin 155 electrically connected to the terminal plate 154 is inserted in the through-hole. The terminal plate 154 is electrically insulated from the battery cover 153 with an insulating case 156 in between. The cathode pin 155 is electrically insulated from the battery cover 153 with a gasket 157 in between. The insulating case 156 is made of, for example, polybutylene terephthalate. The gasket 157 is made of, for example, an insulating material, and the surface thereof is coated with asphalt.

In the vicinity of the rim of the battery cover 153, a cleavage valve 158 and an electrolytic solution injection hole 159 are provided. The cleavage valve 158 is electrically connected to the battery cover 153. When the internal pressure of the battery becomes a certain level or more by internal short circuit, external heating or the like, the cleavage valve 158 is cleaved to increase internal pressure rise. The electrolytic solution injection hole 159 is sealed by a sealing member 159A made of, for example, a stainless steel ball.

In the spirally wound electrode body 160, a cathode 161 and an anode 162 are layered with a separator 163 in between, and are spirally wound. The spirally wound electrode body 160 is shaped planar according to the shape of the package can 151. The separator 163 is located at the outermost circumference of the spirally wound electrode body 160, and the cathode 161 is located just inside thereof. FIG. 12 is a simplified view of the laminated structure of the cathode 161 and the anode 162. The spirally winding number of the spirally wound electrode body 160 is not limited to the number illustrated in FIG. 11 and FIG. 12, but is able to be arbitrarily set. A cathode lead 164 made of aluminum (Al) or the like is connected to the cathode 161 of the spirally wound electrode body 160. An anode lead 165 made of nickel or the like is connected to the anode 162. The cathode lead 164 is electrically connected to the terminal plate 154 by being welded to the lower end of the cathode pin 155. The anode lead 165 is welded and electrically connected to the package can 151.

As illustrated in FIG. 11, in the cathode 161, a cathode active material layer 161B is provided on a single face or both faces of a cathode current collector 161A. In the anode 162, an anode active material layer 162B is provided on a single face or both faces of an anode current collector 162A. Structures of the cathode current collector 161A, the cathode active material layer 161B, the anode current collector 162A, the anode active material layer 162B, and the separator 163 are respectively similar to the structures of the cathode current collector 121A, the cathode active material layer 121B, the anode current collector 122A, the anode active material layer 122B, and the separator 123 in the first secondary battery described above. An electrolytic solution similar to that of the separator 123 impregnates the separator 163.

The third secondary battery is able to be manufactured, for example, as follows.

As in the foregoing first secondary battery, the cathode 161 and the anode 162 are layered with the separator 163 in between and spirally wound, and thereby the spirally wound electrode body 160 is formed. After that, the spirally wound electrode body 160 is contained in the package can 151. Next, the insulating plate 152 is arranged on the spirally wound electrode body 160. The anode lead 165 is welded to the battery can 151, the cathode lead 164 is welded to the lower end of the cathode pin 155, and the battery cover 153 is fixed on the open end of the battery can 151 by laser welding. Finally, the electrolytic solution is injected into the package can 151 through the electrolytic solution injection hole 159, and impregnates the separator 163. After that, the electrolytic solution injection hole 159 is sealed by the sealing member 159A. The secondary battery illustrated in FIG. 11 and FIG. 12 is thereby completed.

According to the third secondary battery, the anode 162 has the structure similar to that of the anode 10 illustrated in FIG. 1 described above. Thus, the cycle characteristics are able to be improved while a high capacity is obtained. Other effect of the third secondary battery is similar to that of the foregoing anode 10.

4. Application of a Lithium Ion Secondary Battery

Next, a description will be given of an application example of the foregoing lithium ion secondary battery.

Applications of the lithium ion secondary battery is not particularly limited as long as the lithium ion secondary battery is applied to a machine, a device, an instrument, an equipment, a system (collective entity of a plurality of devices and the like) or the like that is able to use the lithium ion secondary battery as a drive power source, an electric power storage source for electric power storage or the like. In the case where the lithium ion secondary battery is used as a power source, the lithium ion secondary battery may be used as a main power source (power source used preferentially), or an auxiliary power source (power source used instead of a main power source or used being switched from the main power source). The main power source type is not limited to the lithium ion secondary battery.

Examples of applications of the lithium ion secondary battery include portable electronic devices such as a video camera, a digital still camera, a mobile phone, a notebook personal computer, a cordless phone, a headphone stereo, a portable radio, a portable television, and a Personal Digital Assistant (PDA); a portable lifestyle device daily instrument such as an electric shaver; a storage device such as a backup power source and a memory card; an electric power tool such as an electric drill and an electric saw; a medical electronic device such as a pacemaker and a hearing aid; a vehicle such as a battery car (including a hybrid car); and an electric power storage system such as a home battery system for storing electric power for emergency or the like. It is needless to say that application other than the foregoing applications may be adopted.

Specially, the lithium ion secondary battery is effectively applied to the electric power tool, the battery car, the electric power storage system or the like. In these applications, since superior battery characteristics (cycle characteristics, storage characteristics, and load characteristics and the like) are demanded, the characteristics are able to be effectively improved by using the lithium ion secondary battery. The electric power tool is a tool in which a moving part (for example, a drill or the like) is moved by using the lithium ion secondary battery as a driving power source. The battery car is a car that acts (runs) by using the lithium ion secondary battery as a driving power source. As described above, a car including the drive source as well other than the lithium ion secondary battery (hybrid car or the like) may be adopted. The electric power storage system is a system using the lithium ion secondary battery as an electric power storage source. For example, in a home electric power storage system, electric power is stored in the lithium ion secondary battery as an electric power storage source, and the electric power is consumed according to needs. In the result, various devices such as home electric products become usable.

EXAMPLES

Specific examples of the invention will be described in detail.

Example 1-1

The square secondary battery illustrated in FIG. 11 and FIG. 12 was manufactured by the following procedure. The secondary battery was formed as a lithium ion secondary battery in which the capacity of the anode 162 was expressed based on insertion and extraction of lithium.

First, the cathode 161 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours to obtain lithium cobalt composite oxide ($LiCoO_2$). Subsequently, 96 parts by mass of the lithium cobalt composite oxide as a cathode active material, 1 part by mass of graphite as an electrical conductor, and 3 parts by mass of polyvinylidene fluoride as a binder were mixed to obtain a cathode mixture. After that, the cathode mixture was dispersed in N-methyl-2-pyrrolidone to obtain paste cathode mixture slurry. Finally, both faces of the cathode current collector 161A made of a strip-shaped aluminum foil (thickness: 15 µm) were uniformly coated with the cathode mixture slurry, which was dried. After that, the resultant was compression-molded by a roll pressing machine to form the cathode active material layer 161B. After that, the cathode lead 164 made of aluminum was welded and attached to an end of the cathode current collector 161A.

Next, the anode 162 was formed. Specifically, the anode current collector 162A (thickness: 10 µm, ten point height of roughness profile Rz: 4.0 µm) made of an electrolytic copper foil was prepared. After that, silicon as an anode active material was deposited several times on both faces of the anode current collector 162A by electron beam evaporation method using the evaporation apparatus illustrated in FIG. 3. Thereby, a plurality of anode active material particles 6 (refer to FIG. 5) in which the first region 1 and the second region 2 are each layered to form a total of 20 layers were formed, and the anode active material layer 162B was obtained. At that time, the anode active materials where evaporated onto the surface of the anode current collector 162A moving at a predetermined speed, while intermittently introducing oxygen gas into the evaporation treatment bath 20, and the anode active material layer 162B having a thickness of 4 µm was formed. A substantial film-forming rate at that time was 1 nm/sec to 10 nm/sec both inclusive. Monocrystal silicon of 99.9% purity was used as the evaporation source. In this case, the evaporation materials 32A and 32B were irradiated onto the surface of the anode current collector 101 at an oblique angle. The anode current collector 101 was moved in the forward direction (the direction traveling from the take-up roller 7 to the take-up roller 8) to form the first region 1, and in the reverse direction (the direction traveling from the take-up roller 8 to the take-up roller 8) to form the second region 2. The radius of curvature of the anode active material fiber 4 was adjusted by changing the radius of curvature of the anode current collector 101 at the evaporation positions. After the anode active material layer 162B was formed, the anode lead 165 made of nickel was welded and attached to one end of the anode current collector 162A.

Figure 13A:
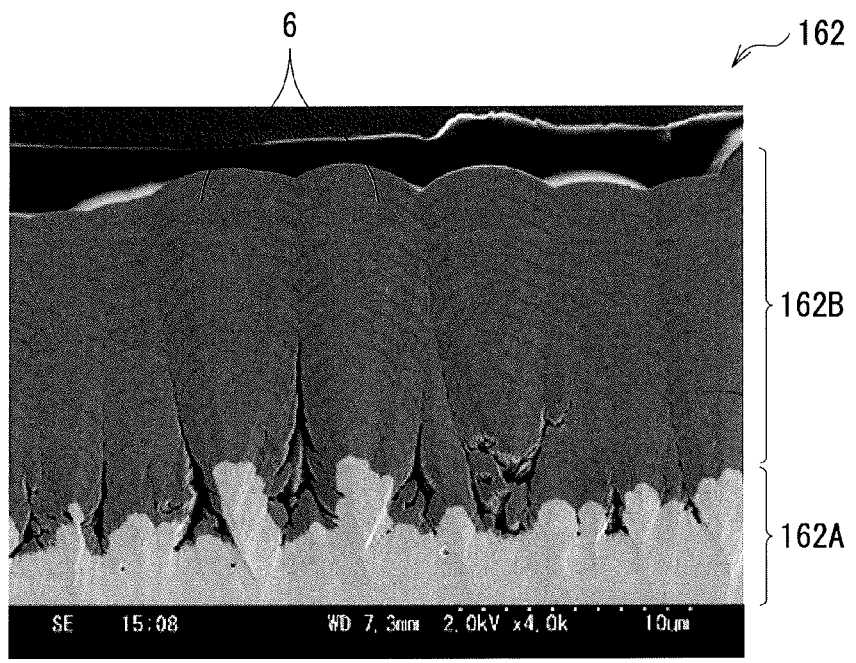
FIG. 13A and FIG. 13B are electronic microscope images illustrating cross sections of an anode for a lithium ion secondary battery of examples.
Figure 13B:
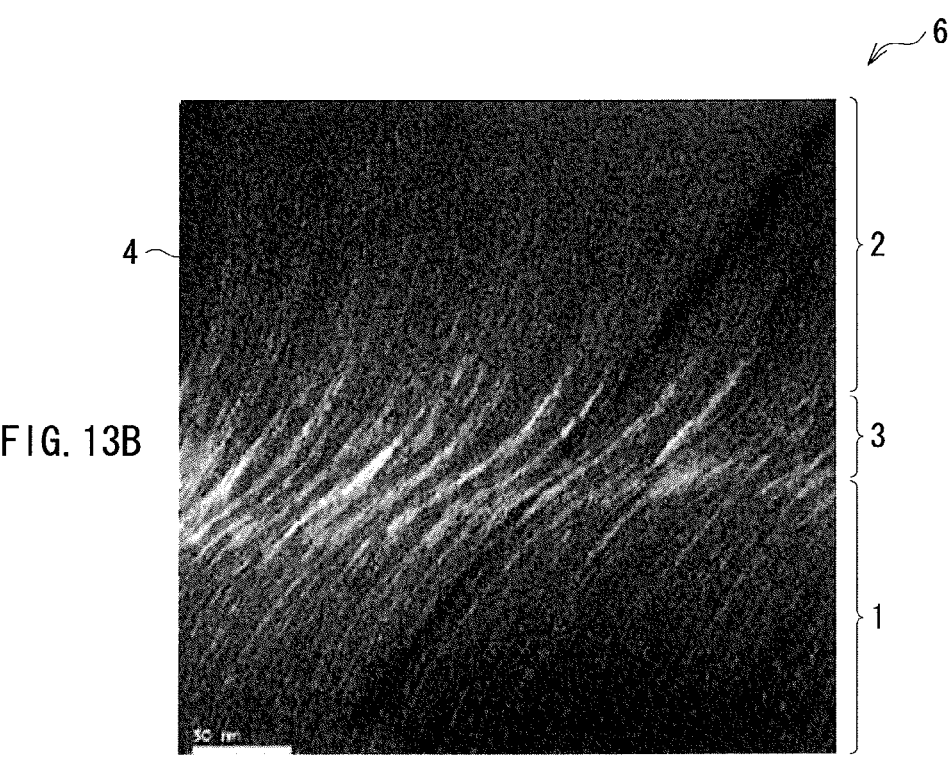

A cross section of the anode 162 obtained as above was enlarged and observed. In the result, for example, as illustrated in FIG. 13A, the plurality of anode active material particles 6 extending in the direction perpendicular to the surface of the anode current collector 162A from the projection section of the surface of the anode current collector 162A as a base point were confirmed. From observation by further enlarging a partial cross section of the anode active material particle 6, as illustrated in FIG. 13B, the S-shaped anode active material fibers 4 extending from the first region 1 to the second region 2 through the oxygen-containing region 3 was observed. FIG. 13A and FIG. 13B are images obtained by observing a cross section of the anode 162 obtained by polishing with the use of a cross section polisher by using a Scanning Electron Microscope (SEM) or a Transmission Electron Microscope (TEM), respectively.

Subsequently, the separator 163 made of a microporous polyethylene film being 23 µm thick was prepared. The cathode 161, the separator 163, the anode 162, and the separator 163 were layered sequentially to form a laminated body. The resultant laminated body was spirally wound several times, and thereby the spirally wound electrode body 160 was formed. The obtained spirally wound electrode body 160 was shaped into a planar shape.

Next, the planar-shaped spirally wound electrode body 160 was contained in the package can 151. After that, the insulating plate 152 was arranged on the spirally wound electrode body 160. The anode lead 165 was welded to the package can 151, the cathode lead 144 was welded to the lower end of the cathode pin 155, and the battery cover 153 was fixed on the open end section of the package can 151 by laser welding. After that, an electrolytic solution was injected into the package can 151 through the electrolytic solution injection hole 159. As the electrolytic solution, an electrolytic solution obtained by dissolving $LiPF_6$ as an electrolyte salt at a concentration of 1 mol/dm$^3$ into a mixed solvent of 50 wt % of ethylene carbonate (EC) and 50 wt % of diethyl carbonate (DEC) was used. Finally, the electrolytic solution injection hole 159 was sealed by the sealing member 159A, and thereby a square type secondary battery was obtained.

Example 1-2

A secondary battery of Example 1-2 was fabricated in the same manner as that of Example 1-1, except that the incident angle of the evaporation materials 32A and 32B to the anode current collector 101 was 0 deg (the evaporation materials 32A and 32B were irradiated in a direction perpendicular to the surface of the anode current collector 101) in forming the anode active material layer 162B using the electron beam evaporation method. Thereby, the anode active material fibers 4 were formed by the pair of inter-linked straight line sections 4A1 and 4B1 as illustrated in FIG. 4A.

Example 1-3

A secondary battery of Example 1-3 was fabricated in the same manner as that of Example 1-1, except that the anode current collector 101 was moved in only the reverse direction and the evaporation rate was twice that of Example 1-1 in forming the anode active material layer 162B using the electron beam evaporation method. Thereby, the anode active material fibers 4 were formed by the pair of inter-linked curvature sections 4A2 and 4B2 as illustrated in FIG. 4B.

Example 1-4

A secondary battery of Example 1-4 was fabricated in the same manner as that of Example 1-1, except that the incident angle of the evaporation materials 32A and 32B to the anode current collector 101 was 0 deg only to form the first region 1 in forming the anode active material layer 162B using the electron beam evaporation method. Thereby, the anode active material fibers 4 were formed by the inter-linked straight line section 4A3 and curvature section 4B3 arranged in sequence from the anode current collector 101 side as illustrated in FIG. 4C.

Example 1-5

A secondary battery of Example 1-5 was fabricated in the same manner as that of Example 1-1, except that the anode current collector 101 was moved in only the reverse direction in forming the anode active material layer 162B using the electron beam evaporation method. Thereby, the anode active material fibers 4 were formed by the inter-linked curvature section 4A4 and curvature section 4B4 so as to form a discontinuous curved line as illustrated in FIG. 4D. Here, the curvature section 4A4 and the curvature section 4B4 curved in the same direction.

Example 1-6

A secondary battery of Example 1-6 was fabricated in the same manner as that of Example 1-1, except that the incident angle of the evaporation materials 32A and 32B to the anode current collector 101 was 0 deg only to form the second region 2 and the anode current collector 101 was moved only in the reverse direction to form the first region 1 in forming the anode active material layer 162B using the electron beam evaporation method. Thereby, the anode active material fibers 4 were formed by the inter-linked curvature section 4A5 and straight line section 4B5 arranged in sequence from the anode current collector 101 side as illustrated in FIG. 4E.

Example 1-7

A secondary battery of Example 1-7 was fabricated in the same manner as that of Example 1-1, except that the anode active material layer 162B was formed by bulk anode active material using the firing method. Specifically, 90 parts by mass of silicon powder with an average grain diameter of 1 µm as the anode active material and 10 parts by mass of polyvinylidene fluoride as a binder were mixed to obtain an anode mixture. After that, the anode mixture was dispersed in N-methyl-2-pyrrolidone to obtain paste anode mixture slurry. Finally, both faces of the anode current collector 162A were uniformly coated with the anode mixture slurry, which was dried. After that, the resultant was compression-molded by a roll pressing machine and heat-treated for 12 hours in a vacuum atmosphere at 400 deg C. to form the anode active material layer 162B.

For the secondary batteries of Examples 1-1 to 1-7 fabricated as above, the cycle characteristics were examined. The results are illustrated in Table 1.

TABLE 1

| Table 1 | Structure of anode active material fiber | Oxygen content (at %) | Radius of curvature of anode active material fiber (nm) | Discharge capacity retention ratio (%) | | |
|---|---|---|---|---|---|---|
| | | | | 100 cyc | 200 cyc | 300 cyc |
| Example 1-1 | FIG. 2 | 13 | 168 | 86 | 78 | 72 |
| Example 1-2 | FIG. 4A | 12 | — | 75 | 50 | 39 |
| Example 1-3 | FIG. 4B | 12 | 166 | 84 | 72 | 66 |
| Example 1-4 | FIG. 4C | 13 | 160 | 82 | 70 | 63 |
| Example 1-5 | FIG. 4D | 12 | 159 | 82 | 70 | 62 |
| Example 1-6 | FIG. 4E | 12 | 163 | 81 | 68 | 60 |
| Example 1-7 | Bulk | 11 | — | 65 | 40 | 20 |

In examining the cycle characteristics, a cycle test was performed by the following procedure and thereby the discharge capacity retention ratio was obtained. First, first charge and discharge were performed and a first discharge capacity retention ratio was measured in the atmosphere at 25 deg C. Subsequently, charge and discharge were performed 99 cycles in the same atmosphere to measure the discharge capacity at the 100th cycle. Finally, the discharge capacity retention ratio (%)=(discharge capacity at the 100th cycle/ first discharge capacity)*100 was calculated. Subsequently, the discharge capacities at the 200th cycle and at the 300th cycle were measured and the discharge capacity retention ratios (%) were similarly obtained. In this case, conditions of a single charge and discharge cycle are as follows. First, constant current charge was performed at the constant current density of 2 mA/cm$^2$ until the battery voltage reached 4.2 V, constant voltage charge was continuously performed at the constant voltage of 4.2 V until the current density reached 0.05 mA/cm$^2$, and constant current discharge was performed at the constant current density of 0.05 mA/cm$^2$ until the battery voltage reached 2.5 V.

The amount of oxygen in the anode active material layer 162B in each example (oxygen content in the anode active material (atomic %)) was measured as follows. That is, a cross section of the anode active material layer 162B was cut and analyzed using AES (Auger Electron Spectroscopy). Here, measurements were conducted in five locations in the cross section of the anode active material layer 162B, and an average value thereof was obtained.

Further, based on the TEM image of the cross section of the anode 162 illustrated as an example in FIG. 13B, the minimum radius of curvature of the anode active material fibers 4 was also measured. Here, the minimum radii of curvature of five anode active material fibers 4 selected randomly were measured, and an average value thereof was obtained. These results are also illustrated in Table 1.

It was confirmed that, as illustrated in Table 1, since the anode active material layer 162B has anode active material fibers 4 in Examples 1-1 to 1-6, the discharge capacity retention ratio was improved compared to the case where the bulk anode active material was used (Example 1-7). In particular, a higher discharge capacity retention ratio was obtained in the case where the anode active material fibers 4 have the curvature sections compared to the case where the anode active material fibers 4 have only straight line sections (Example 1-2). Thereby, it was confirmed that the anode active material fibers 4 having curvature sections are more suited for relaxing stress than the anode active material fibers 4 having only straight line sections. Specially, the highest discharge capacity retention ratio was obtained in the case where the anode active material fibers 4 formed an S-shape (Example 1-1), since the S-shape of the anode active material fibers 4 do not include discontinuous curvature sections and includes sections curving in opposite directions from each other, and thereby is more suited for relaxing stress applied in several directions, compared to other shapes.

Examples 2-1 to 2-6

Next, secondary batteries were fabricated in the same manner as that of Example 1-1 except that the amount of oxygen gas introduced was changed in forming the anode active material layer 162B using the electron beam evaporation method.

For Examples 2-1 to 2-6 as well, the cycle characteristics (discharge capacity retention ratio), the oxygen content in the anode active material (atomic %), and the minimum radius of curvature of the anode active material fibers 4 were measured in a similar manner as the foregoing. The results are illustrated in Table 2.

TABLE 2

| Table 2 | Structure of anode active material fiber | Oxygen content (at %) | Radius of curvature of anode active material fiber (nm) | Discharge capacity retention ratio (%) | | |
|---|---|---|---|---|---|---|
| | | | | 100 cyc | 200 cyc | 300 cyc |
| Example 2-1 | FIG. 2 | 1 | 170 | 78 | 65 | 59 |
| Example 2-2 | FIG. 2 | 3 | 172 | 84 | 74 | 68 |
| Example 2-3 | FIG. 2 | 20 | 165 | 86 | 78 | 72 |
| Example 2-4 | FIG. 2 | 29 | 162 | 87 | 80 | 74 |
| Example 2-5 | FIG. 2 | 46 | 169 | 87 | 80 | 74 |
| Example 2-6 | FIG. 2 | 58 | 168 | 78 | 70 | 63 |

It became clear that, as illustrated in Table 2, the cycle characteristics change by changing the oxygen content in the anode active material. In particular, more favorable cycle characteristics were obtained in the case where the oxygen content was 3 atomic % to 46 atomic % both inclusive.

Examples 3-1 to 3-16

Secondary batteries were fabricated in the same manner as that of Example 1-1, except that the radius of curvature of the anode current collector 101 at the evaporation positions for forming the anode active material layer 162B using the electron beam evaporation method was changed.

For Examples 3-1 to 3-16 as well, the cycle characteristics (discharge capacity retention ratio), the oxygen content in the anode active material (atomic %), and the minimum radius of curvature of the anode active material fibers 4 were measured in a similar manner as the foregoing. The results are illustrated in Table 3.

TABLE 3

| Table 3 | Radius of curvature of anode collector | Oxygen content (at %) | Radius of curvature of anode active material fiber (nm) | Discharge capacity retention ratio (%) | | |
|---|---|---|---|---|---|---|
| | | | | 100 cyc | 200 cyc | 300 cyc |
| Example 3-1 | 0.02 | 12 | 32 | 81 | 55 | 45 |
| Example 3-2 | 0.04 | 12 | 54 | 83 | 60 | 52 |
| Example 3-3 | 0.05 | 12 | 88 | 84 | 68 | 63 |
| Example 3-4 | 0.08 | 12 | 102 | 85 | 73 | 68 |
| Example 3-5 | 0.1 | 12 | 115 | 85 | 76 | 70 |
| Example 3-6 | 0.15 | 13 | 133 | 85 | 78 | 72 |
| Example 3-7 | 0.25 | 13 | 205 | 86 | 78 | 72 |
| Example 3-8 | 0.5 | 13 | 280 | 86 | 78 | 72 |
| Example 3-9 | 0.8 | 13 | 320 | 85 | 78 | 72 |
| Example 3-10 | 1 | 13 | 380 | 85 | 77 | 72 |
| Example 3-11 | 1.5 | 12 | 405 | 85 | 74 | 69 |
| Example 3-12 | 2 | 14 | 510 | 83 | 74 | 68 |
| Example 3-13 | 2.5 | 12 | 580 | 84 | 67 | 62 |
| Example 3-14 | 3 | 13 | 650 | 81 | 60 | 55 |
| Example 3-15 | 3.5 | 13 | 780 | 78 | 55 | 45 |
| Example 3-16 | 4 | 13 | 865 | 76 | 52 | 40 |

It became clear that, as illustrated in Table 3, the cycle characteristics change by changing the minimum radius of curvature of the anode active material fibers 4. In particular, more favorable cycle characteristics were obtained in the case where the minimum radius of curvature was 102 nm to 405 nm both inclusive.

From the results of the foregoing respective examples, it was found that according to the lithium ion secondary battery, structural break of the anode active material layer having a multilayer structure is inhibited, and contact characteristics between each layer in the multilayer structure were improved, and thus the cycle characteristics thereof were superior.

The present application has been described with reference to the embodiments and the examples. However, the present application is not limited to the aspects described in the foregoing embodiments and the foregoing examples, and various modifications may be made. For example, the description has been given of the case that the anode capacity is expressed based on insertion and extraction of lithium ions. However, the secondary battery is not limited thereto. The present application is similarly applicable to a secondary battery in which the anode capacity includes the capacity due to inserting and extracting lithium ions and the capacity due to precipitation and dissolution of lithium metal, and the anode capacity is expressed by the sum of these capacities. In this case, an anode material capable of insertion and extraction of lithium ions is used as an anode active material, and the chargeable capacity of the anode material is set to a smaller value than the discharge capacity of the cathode.

Further, the description has been given of the case in which the battery structure is the cylindrical type, the laminated film type, or the square type, and of the case in which the battery element has the spirally wound structure. However, the battery structure is not limited thereto, but the invention is similarly applicable to a case that the battery structure is a coin type or a button type, or a case that the battery element has a laminated structure or the like.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode for a lithium ion secondary battery comprising:
an anode active material layer including a plurality of anode active material fibers containing silicon as an element provided on an anode current collector,
wherein the anode active material layer has a multilayer structure in which a laminar first region, a laminar oxygen-containing region and a laminar second region are alternately layered, the laminar oxygen-containing region extending parallel to the anode current collector,
wherein the laminar oxygen-containing region has a higher oxygen content than each of the laminar first region and the laminar second region,
wherein the anode active material fibers form an S-shape in which first and second curvature sections that curve in different directions are linked together in the laminar oxygen-containing region, and
wherein each of the anode active material fibers has a diameter of 50 nm or less.

2. The anode for a lithium ion secondary battery according to claim 1, wherein the plurality of anode active material fibers each extend in a thickness direction of the anode active material layer.

3. The anode for a lithium ion secondary battery according to claim 1, wherein a minimum radius of curvature of the pair of curvature sections is 102 nm to 405 nm both inclusive.

4. The anode for a lithium ion secondary battery according to claim 1, wherein the anode active material fiber contains oxygen as an element, and oxygen content in the anode active material layer is 3 atomic % to 46 atomic % both inclusive.

5. The anode for a lithium ion secondary battery according to claim 1, wherein:
the plurality of anode active material fibers each extend in the thickness direction of the anode active material layer,
the laminar first region includes the first curvature section, and
the laminar second region includes the second curvature section.

6. The anode for a lithium ion secondary battery according to claim 1, wherein the anode active material layer includes a plurality of particles provided on the anode current collector.

7. The anode for a lithium ion secondary battery according to claim 6, wherein the particles have a multilayer structure including the plurality of anode active material fibers in each layer.

8. The anode for a lithium ion secondary battery according to claim 6, wherein the particles are formed by vapor-phase deposition method.

9. The anode for a lithium ion secondary battery according to claim 1, wherein a thickness of the laminar oxygen-containing region ranges from 10 nm to 200 nm, and a thickness of each of the laminar first region and the laminar second region ranges from 50 nm to 3000 nm.

10. The anode for a lithium ion secondary battery according to claim 1, wherein each of the anode active material fibers has an aspect ratio of at least 1:10.

11. A lithium ion secondary battery comprising:
a cathode;
an anode; and
an electrolyte,
wherein the anode has an anode active material layer including a plurality of anode active material fibers containing silicon as an element provided on an anode current collector,
wherein the anode active material layer has a multilayer structure in which a laminar first region, a laminar oxygen-containing region and a laminar second region are alternately layered, the laminar oxygen-containing region extending parallel to the anode current collector,
wherein the laminar oxygen-containing region has a higher oxygen content than each of the laminar first region and the laminar second region,
wherein the plurality of anode active material fibers each extend in the thickness direction of the anode active material layer and form an S-shape in which a pair of curvature sections curving in different directions are linked in the laminar oxygen-containing region, and
wherein each of the anode active material fibers has a diameter of 50 nm or less.

12. An electric tool acting with the use of a lithium ion secondary battery including a cathode, an anode, and an electrolytic solution as a power source,
wherein the anode has an anode active material layer including a plurality of anode active material fibers containing silicon as an element provided on an anode current collector,
wherein the anode active material layer has a multilayer structure in which a laminar first region, a laminar oxygen-containing region and a laminar second region are alternately layered, the laminar oxygen-containing region extending parallel to the anode current collector,
wherein the laminar oxygen-containing region has a higher oxygen content than each of the laminar first region and the laminar second region,
wherein the plurality of anode active material fibers each extend in the thickness direction of the anode active material layer and form an S-shape in which a pair of curvature sections curving in different directions are linked in the laminar oxygen-containing region, and
wherein each of the anode active material fibers has a diameter of 50 nm or less.

13. A battery car acting with the use of a lithium ion secondary battery including a cathode, an anode, and an electrolytic solution as a power source,
wherein the anode has an anode active material layer including a plurality of anode active material fibers containing silicon as an element provided on an anode current collector,
wherein the anode active material layer has a multilayer structure in which a laminar first region, a laminar oxygen-containing region and a laminar second region are alternately layered, the laminar oxygen-containing region extending parallel to the anode current collector,
wherein the laminar oxygen-containing region has a higher oxygen content than each of the laminar first region and the laminar second region,
wherein the plurality of anode active material fibers each extend in the thickness direction of the anode active material layer and form an S-shape in which a pair of curvature sections curving in different directions are linked in the laminar oxygen-containing region, and
wherein each of the anode active material fibers has a diameter of 50 nm or less.

14. An electric power storage system acting with the use of a lithium ion secondary battery including a cathode, an anode, and an electrolytic solution as a power source, wherein the anode has an anode active material layer including a plurality of anode active material fibers containing silicon as an element provided on an anode current collector, wherein the anode active material layer has a multilayer structure in which a laminar first region, a laminar oxygen-containing region and a laminar second region are alternately layered, the laminar oxygen-containing region extending parallel to the anode current collector, wherein the laminar oxygen-containing region has a higher oxygen content than each of the laminar first region and the laminar second region, wherein the plurality of anode active material fibers each extend in the thickness direction of the anode active material layer and form an S-shape in which a pair of curvature sections curving in different directions are linked in the laminar oxygen-containing region, and wherein each of the anode active material fibers has a diameter of 50 nm or less.

* * * * *